(12) United States Patent
Park et al.

(10) Patent No.: US 10,732,467 B2
(45) Date of Patent: Aug. 4, 2020

(54) REFLECTIVE LIQUID CRYSTAL DISPLAY DEVICE

(71) Applicant: Samsung Display Co., Ltd., Yongin-Si, Gyeonggi-Do (KR)

(72) Inventors: Seunghyun Park, Seoul (KR); Junho Song, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 91 days.

(21) Appl. No.: 15/986,415

(22) Filed: May 22, 2018

(65) Prior Publication Data

US 2019/0107758 A1    Apr. 11, 2019

(30) Foreign Application Priority Data

Oct. 11, 2017    (KR) ........................ 10-2017-0131661

(51) Int. Cl.
*G02F 1/1343*    (2006.01)
*G02F 1/1335*    (2006.01)
*G02F 1/1333*    (2006.01)

(52) U.S. Cl.
CPC .. *G02F 1/134309* (2013.01); *G02F 1/133371* (2013.01); *G02F 1/133514* (2013.01); *G02F 1/133512* (2013.01); *G02F 2201/123* (2013.01); *G02F 2201/52* (2013.01); *G02F 2203/02* (2013.01)

(58) Field of Classification Search
CPC ......... G02F 1/134309; G02F 1/133514; G02F 1/133371; G02F 1/133512; G02F 2201/52; G02F 2201/123; G02F 2203/02

USPC ........................................................ 349/106
See application file for complete search history.

(56) References Cited

U.S. PATENT DOCUMENTS

| 7,452,604 B2 | 11/2008 | Takagi et al. |
| 7,515,225 B2 | 4/2009 | Park |
| 9,645,443 B2 | 5/2017 | Fukunaga et al. |
| | (Continued) | |

FOREIGN PATENT DOCUMENTS

| JP | 2016-035571 A | 3/2016 |
| KR | 100644006 B1 | 11/2006 |
| | (Continued) | |

*Primary Examiner* — Nathanael R Briggs
*Assistant Examiner* — William D Peterson
(74) *Attorney, Agent, or Firm* — Innovation Counsel LLP

(57) ABSTRACT

Provided is a reflective liquid crystal display device of an embodiment, including a plurality of pixel areas having a blue pixel area and a white pixel area adjacent to each other in a first direction, wherein the blue pixel area includes a first blue pixel part including a first pixel electrode and a first blue filter that overlaps the first pixel electrode, and a second blue pixel part including a second blue filter that does not overlap the first pixel electrode, wherein the white pixel area includes a first sub-white pixel part including a second pixel electrode and a third blue filter that overlaps the second pixel electrode, a second sub-white pixel part disposed between the second blue pixel part and the first sub-white pixel part and including the third blue filter, and a first white pixel part adjacent to the first sub-white pixel part and including the second pixel electrode and a first white filter that overlaps the second pixel electrode, which may improve the color sense for white light.

19 Claims, 16 Drawing Sheets

(56) References Cited

U.S. PATENT DOCUMENTS

| | | | |
|---|---|---|---|
| 2007/0002225 A1* | 1/2007 | Baek | G09G 3/3648 349/114 |
| 2016/0033816 A1* | 2/2016 | Yoon | G02F 1/33512 349/108 |
| 2017/0010503 A1 | 1/2017 | Song et al. | |
| 2017/0146855 A1 | 5/2017 | Park et al. | |

FOREIGN PATENT DOCUMENTS

| | | |
|---|---|---|
| KR | 1020070072666 A | 7/2007 |
| KR | 100990500 B1 | 10/2010 |
| KR | 1020130034168 A | 4/2013 |
| KR | 101736929 B1 | 5/2017 |
| KR | 1020170059027 A | 5/2017 |

* cited by examiner

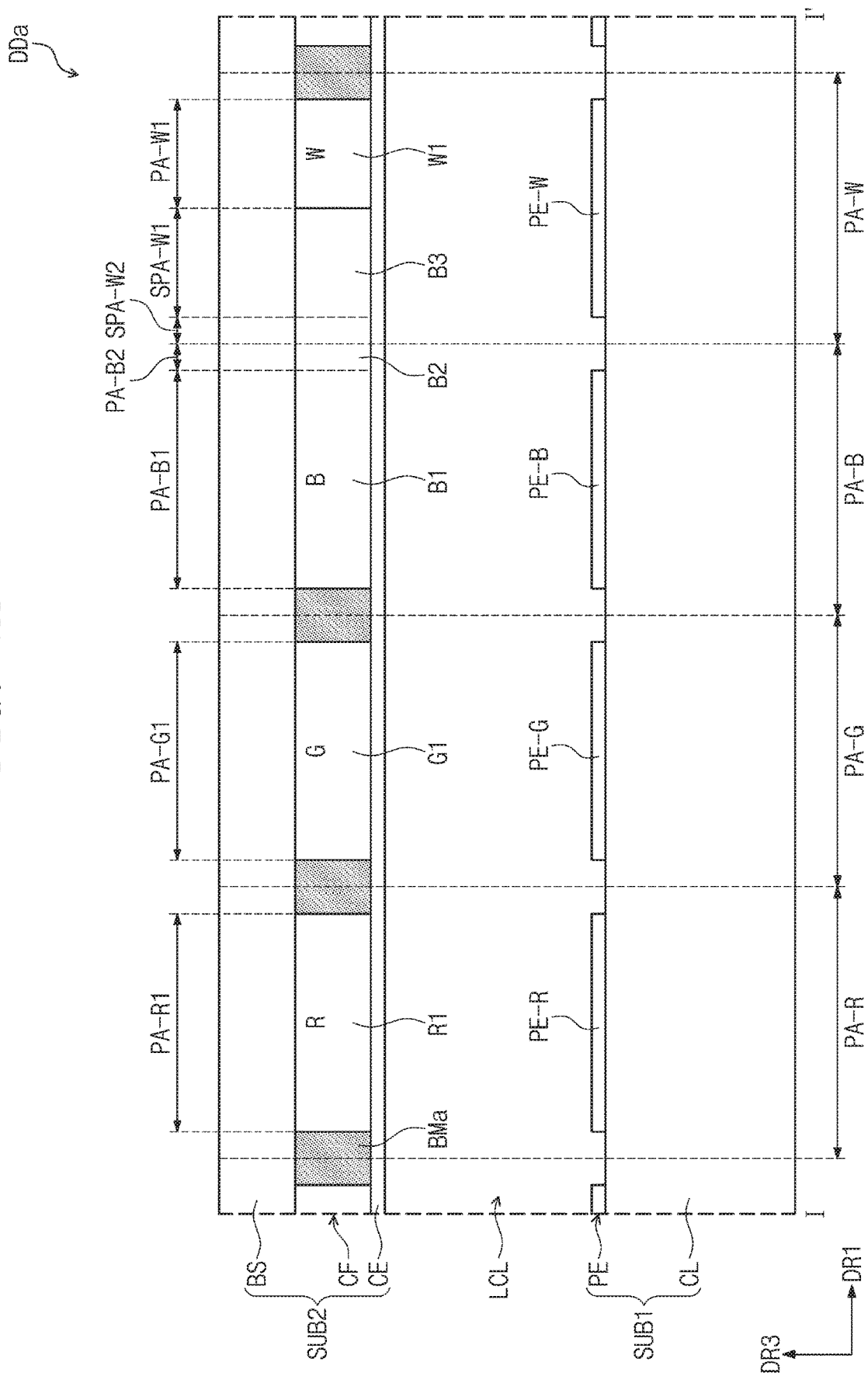

REFLECTIVE LIQUID CRYSTAL DISPLAY DEVICE

CROSS-REFERENCE TO RELATED APPLICATIONS

This U.S. non-provisional patent application claims priority under 35 U.S.C. § 119 to Korean Patent Application No. 10-2017-0131661, filed on Oct. 11, 2017, the entire contents of which are hereby incorporated by reference.

BACKGROUND

The present disclosure herein relates to a reflective liquid crystal display device and, more particularly, to a reflective liquid crystal display device in which a ratio of the areas between color filters having different colors is adjusted.

Various types of display devices are being used for providing image information, and liquid crystal display devices are being used in large display devices and portable display devices because of their low power consumption. The liquid crystal display devices include a transmissive type, a reflective type, and a transflective type. Reflective liquid crystal display devices use external light such as solar light and indoor light, as light source, or use a light source separately disposed on a liquid crystal display panel to display an image.

Particularly, there is a limitation in that reflective or transflective liquid crystal display devices emit greenish white light caused by the effects of the indoor light and the solar light used as the light source, and a metal material used in a reflective electrode and a reflective plate.

SUMMARY

The present disclosure provides a reflective liquid crystal display device having an improved color sense for white.

The present disclosure also provides a reflective liquid crystal display device that relatively increases the area of a blue filter and optimizes a cell gap of a liquid crystal layer overlapping the blue filter, to thereby maintain reflective luminance and improve color reproduction quality.

An embodiment of the inventive concept provides a reflective liquid crystal display device including a plurality of pixel areas, wherein the pixel areas include a blue pixel area and a white pixel area adjacent to each other in a first direction, and the blue pixel area includes: a first blue pixel part including a first pixel electrode and a first blue filter that overlaps the first pixel electrode; and a second blue pixel part adjacent to the first blue pixel part and including a second blue filter that does not overlap the first pixel electrode, and the white pixel area includes: a first sub-white pixel part including a second pixel electrode and a third blue filter that overlaps the second pixel electrode and is adjacent to the second blue filter; a second sub-white pixel part disposed between the second blue pixel part and the first sub-white pixel part and including the third blue filter that does not overlap the second pixel electrode; and a first white pixel part adjacent to the first sub-white pixel part and including the second pixel electrode a first white filter that overlaps the second pixel electrode.

In an embodiment, the plurality of pixel areas may further include a red pixel area and a green pixel area, the red pixel area may include a first red pixel part that includes a third pixel electrode and a first red filter that overlaps the third pixel electrode, and the green pixel area may include a first green pixel part that includes a fourth pixel electrode and a first green filter that overlaps the fourth pixel electrode.

In an embodiment, the white pixel area may further include a second white pixel part adjacent to the first white pixel part and including a second white filter that does not overlaps the second pixel electrode, the red pixel area may further include a second red pixel part adjacent to the first red pixel part and including a second red filter that does not overlap the third pixel electrode, and the green pixel area may further include a second green pixel part adjacent to the first green pixel part and including a second green filter that does not overlap the fourth pixel electrode.

In an embodiment, the reflective liquid crystal display device may further include a light shielding part disposed between the first red pixel part and the first green pixel part, between the first green pixel part and the first blue pixel part, and between the first white pixel part and the first red pixel part. The light shielding part may not be disposed between the first blue pixel part and the first white pixel part.

In an embodiment, each of the red pixel area, the green pixel area, the blue pixel area, and the white pixel area may be provided in plurality, and the respective red pixel areas, the respective green pixel areas, the respective blue pixel areas, and the respective white pixel areas may be arranged in a second direction crossing the first direction.

In an embodiment, in a plan view, a blue filter may have the area greater than that of each of the first red filter and the first green filter, and the blue filter may have the area equal to the sum of those of the first blue filter, the second blue filter, and the third blue filter.

In an embodiment, in a plan view, the first white filter may have the area less than that of each of the first red filter and the first green filter.

In an embodiment, a ratio of the area of the first white filter and the area of the blue filter may be equal to or greater than 0.25:1 and less than 1:1.

In an embodiment, a ratio of the area of the blue filter and the area of the first pixel electrode may be equal to or greater than 1:1 and equal to or less than 1.6:1.

In an embodiment, the reflective liquid crystal display device of the embodiment may further include an auxiliary layer, wherein the auxiliary layer includes: a first auxiliary layer configured to cover the first to third blue filters; a second auxiliary layer configured to cover the first white filter; a third auxiliary layer configured to cover the first red filter; and a fourth auxiliary layer configured to cover the first green filter.

In an embodiment, the first auxiliary layer may have a thickness greater than that of each of the second to fourth auxiliary layers.

In an embodiment, the thickness of the first auxiliary layer may be t1, the thickness of the second auxiliary layer may be t2, the thickness of the third auxiliary layer may be t3, and the thickness of the fourth auxiliary layer may be t4, where t3<t2=t4<t1.

In an embodiment, the first white filter and the second auxiliary layer may be formed of the same material and be formed in one piece.

In an embodiment, in a plan view, a boundary between the third blue filter and the first white filter may be disposed in the white pixel area.

In an embodiment, in a plan view, a boundary between the first auxiliary layer and the second auxiliary layer may be disposed in the white pixel area.

In an embodiment, a gap between the first auxiliary layer and the first pixel electrode may be G1, a gap between the third auxiliary layer and the third pixel electrode may be G3, and a gap between the fourth auxiliary layer and the fourth pixel electrode may be G4, wherein G1 is less than G3 and G4.

In an embodiment of the inventive concept, the embodiment includes: a first substrate in which a red pixel electrode, a green pixel electrode, a blue pixel electrode, and a white pixel electrode are arranged to be spaced apart from each other in a first direction; a second substrate including a color filter part that includes a red filter, a green filter, a blue filter, and a white filter facing the red, green, blue, and white pixel electrodes, respectively; and a liquid crystal layer disposed between the first substrate and the second substrate, wherein the blue filter includes: a first blue filter overlapping the blue pixel electrode; a second blue filter adjacent to the first blue filter and not overlapping the blue pixel electrode; and a third blue filter overlapping the white pixel electrode, wherein the white filter includes a first white filter overlapping the white pixel electrode.

In an embodiment, the blue filter may have the area greater than that of each of the red filter and the green filter, and each of the red filter and the green filter may have the area greater than that of the white filter.

In an embodiment, the embodiment may further includes an auxiliary layer facing the first substrate and configured to cover the color filter part, wherein a first gap between the auxiliary layer and the first substrate in an area overlapping the blue filter is less than a second gap between the auxiliary layer and the first substrate in areas overlapping the red filter, the green filter, and the white filter.

In an embodiment, the liquid crystal layer may include vertically aligned-liquid crystal molecules.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 5A and FIG. 5B are cross-sectional views of a reflective liquid crystal display device of an embodiment in a region corresponding to the line I-I' of FIG. 2;

DETAILED DESCRIPTION

Figure 1:
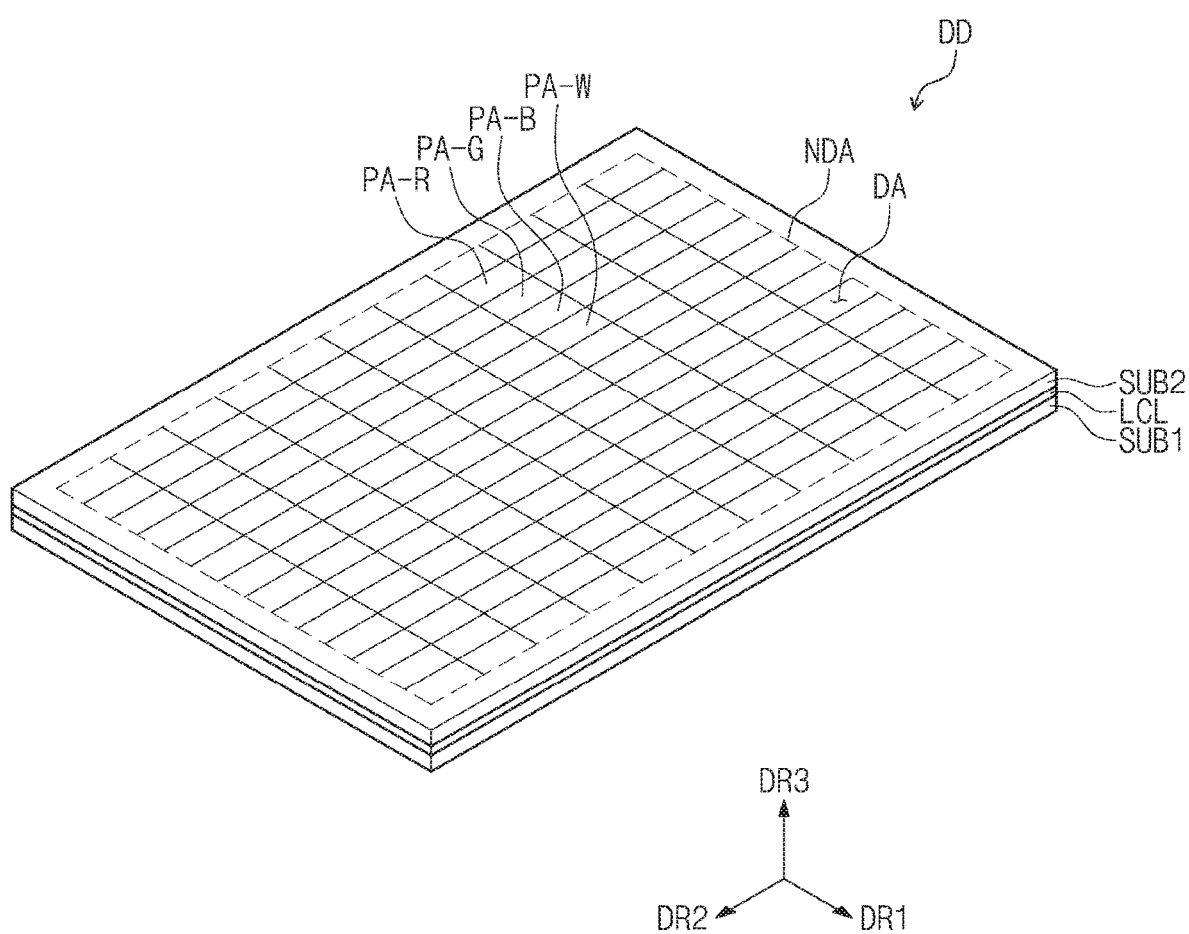
FIG. 1 is a perspective view of a reflective liquid crystal display device of an embodiment.

Since an embodiment of the inventive concept may have various modifications and diverse shapes, particular embodiments are illustrated in the drawings and are described in the detailed description. However, this does not intent to limit the present disclosure within particular embodiments, and it should be understood that the present disclosure covers all the modifications, equivalents, and replacements within the idea and technical scope of the present disclosure.

When explaining each of drawings, like reference numerals are used for referring to similar elements. In the accompanying drawings, the dimensions of each structure are exaggeratingly illustrated for clarity of the present disclosure. Although the terms such as first and second are used herein to describe various elements, these elements should not be limited by these terms. The terms are only used to distinguish one element from other elements. For example, a first element can be referred to as a second element, and similarly a second element can be referred to as a first element without departing from the scope of the present disclosure. The terms of a singular form may include plural forms unless definitely indicating a particular case in terms of the context.

In the present application, it will be understood that the meaning of "comprise" or "have" specifies the presence of a feature, a fixed number, a step, a process, an element, a component, or a combination thereof disclosed in the specification, but does not exclude the possibility of presence or addition of one or more other features, fixed numbers, steps, processes, elements, components, or combination thereof.

In the present application, when a layer, a film, a region, or a plate is referred to as being "above" or "in a upper portion" another layer, film, region, or plate, it can be directly on the layer, film, region, or plate, or intervening layers, films, regions, or plates may also be present. On the contrary to this, when a layer, a film, a region, or a plate is referred to as being "under", "in a lower portion of" another layer, film, region, or plate, it can be directly under the layer, film, region, or plate, or intervening layers, films, regions, or plates may also be present. In addition, when a layer, a film, a region, or a plate is referred to as being "above" another layer, film, region, or plate, it can be not only disposed in the upper portion of the layer, film, region, or plate, but also disposed in the lower portion of the layer, film, region, or plate.

Hereinafter, a reflective liquid crystal display device according to an embodiment of the inventive concept will be described with reference to the drawings.

Figure 2:
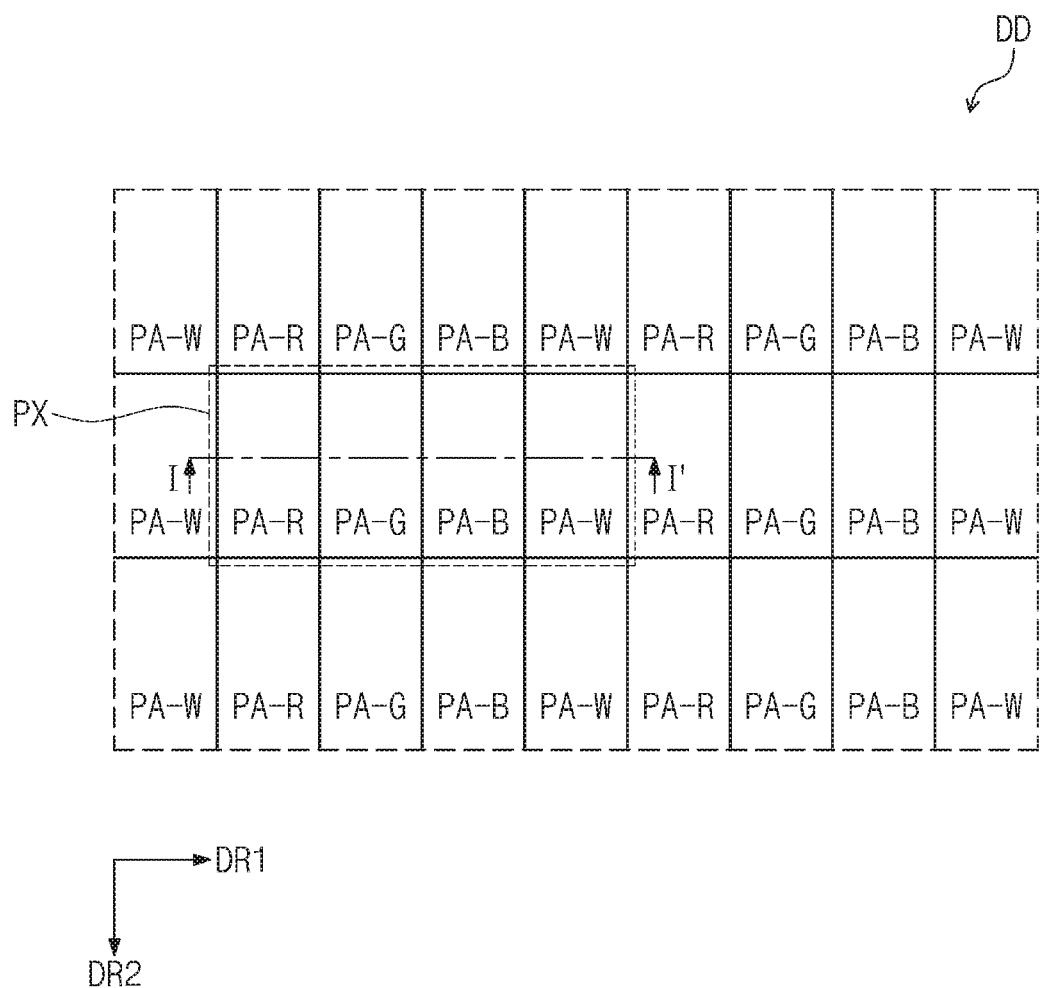
FIG. 2 is a plan view showing a portion of a reflective liquid crystal display device of an embodiment illustrated in FIG. 1.

FIG. 1 is a perspective view of a reflective liquid crystal display device of an embodiment. FIG. 2 is a plan view showing a portion of the reflective liquid crystal display device of the embodiment.

Referring to FIGS. 1 and 2, a reflective liquid crystal display device DD of the embodiment may include a first substrate SUB1 and a second substrate SUB2 facing each other, and a liquid crystal layer LCL disposed between the first substrate SUB1 and the second substrate SUB2.

The reflective liquid crystal display device DD of the embodiment may include a plurality of pixel areas PA-R, PA-G, PA-B, and PA-W. The plurality of pixel areas PA-R, PA-G, PA-B, and PA-W may arranged, in a matrix form, on a plane defined by a first directional axis DR1 and a second directional axis DR2. For example, the plurality of pixel areas PA-R, PA-G, PA-B, and PA-W may be areas defined by a plurality gate lines GGL (see FIG. 3) and a plurality of data lines DL (see FIG. 3). The plurality of pixel areas PA-R, PA-G, PA-B, and PA-W may be regions corresponding to a plurality of pixel electrodes PE-R, PE-G, PE-B, and PE-W (see FIG. 5A), respectively.

The pixel areas, which produce different colors, of the plurality of pixel areas PA-R, PA-G, PA-B, and PA-W, may be arranged in the first directional axis DR1. Also, the pixel areas which produce the same color may be arranged in the second directional axis DR2.

The plurality of pixel areas PA-R, PA-G, PA-B, and PA-W may include the blue pixel area PA-B and the white pixel area PA-W arranged adjacent to each other in the first directional axis DR1. Also, the reflective liquid crystal display device DD of the embodiment may further include a red pixel area PA-R and a green pixel area PA-G.

For example, as illustrated in FIGS. 1 and 2, the pixel areas are arranged in the reflective liquid crystal display device DD of the embodiment in the first directional axis DR1, in the order of the red pixel area PA-R, the green pixel area PA-G, the blue pixel area PA-B, and the white pixel area PA-W. That is, in the first directional axis DR1, the pixel areas may be arranged in the order of the red pixel area PA-R, the green pixel area PA-G, the blue pixel area PA-B, and the white pixel area PA-W, which produce different colors. Also, in the second directional axis DR2 crossing the first directional axis DR1, each of the red pixel areas PA-R, the green pixel areas PA-G, the blue pixel areas PA-B, and the white pixel areas PA-W may be arranged.

Particularly, the reflective liquid crystal display device of the embodiment may include the pixel areas arranged, in the first directional axis DR1, repeatedly in the order of the red pixel area PA-R, the green pixel area PA-G, the blue pixel area PA-B, and the white pixel area PA-W. Also, the reflective liquid crystal display device may include the pixel areas in which each of the red pixel areas PA-R, the green pixel areas PA-G, the blue pixel areas PA-B, and the white pixel areas PA-W is aligned in rows in the second directional axis DR2.

Alternatively, unlike the feature illustrated in FIGS. 1 and 2, the reflective liquid crystal display device DD of the embodiment may include the plurality of pixel areas PA-R, PA-G, PA-B, and PA-W in which the positions of the green pixel area PA-G and the red pixel area PA-R are switched to each other. That is, the reflective liquid crystal display device DD of the embodiment may include the plurality of pixel areas PA-R, PA-G, PA-B, and PA-W which are arranged, in the first directional axis DR1, repeatedly in the order of the green pixel area PA-G, the red pixel area PA-R, the blue pixel area PA-B, and the white pixel area PA-W.

The plurality of pixel areas PA-R, PA-G, PA-B, and PA-W may be arranged in a display area DA. A non-display area NDA surrounding the display area DA may be disposed outside the display area DA. For example, the non-display area NDA may be omitted, or the non-display area NDA may be located on at least one side of the display area DA without surrounding the whole display area DA, unlike the drawing.

Alternatively, in an embodiment, each of the pixel areas PA-R, PA-G, PA-B, and PA-W may be a sub-pixel area, and a group of such pixel areas PA-R, PA-G, PA-B, and PA-W may be defined as one main pixel area PX. For example, the main pixel area PX may be controlled as one unit and then driven, when the display device is operated.

In FIG. 1, the reflective liquid crystal display device of the embodiment is illustrated as including four different types of pixel areas PA-R, PA-G, PA-B, and PA-W, but the embodiment of the inventive concept is not limited. For example, five or more different types of pixel areas may be included. Here, the different types of pixel areas may mean pixel areas that produce light having different colors. Alternatively, the reflective liquid crystal display device of the embodiment may include pixel areas emitting light having other colors, instead of the red pixel area PA-R and the green pixel area PA-G. Alternatively, the pixel areas of the reflective liquid crystal display device of the embodiment may further include pixel areas that emit light having other colors, in addition to the red pixel area PA-R and the green pixel area PA-G.

Figure 3:
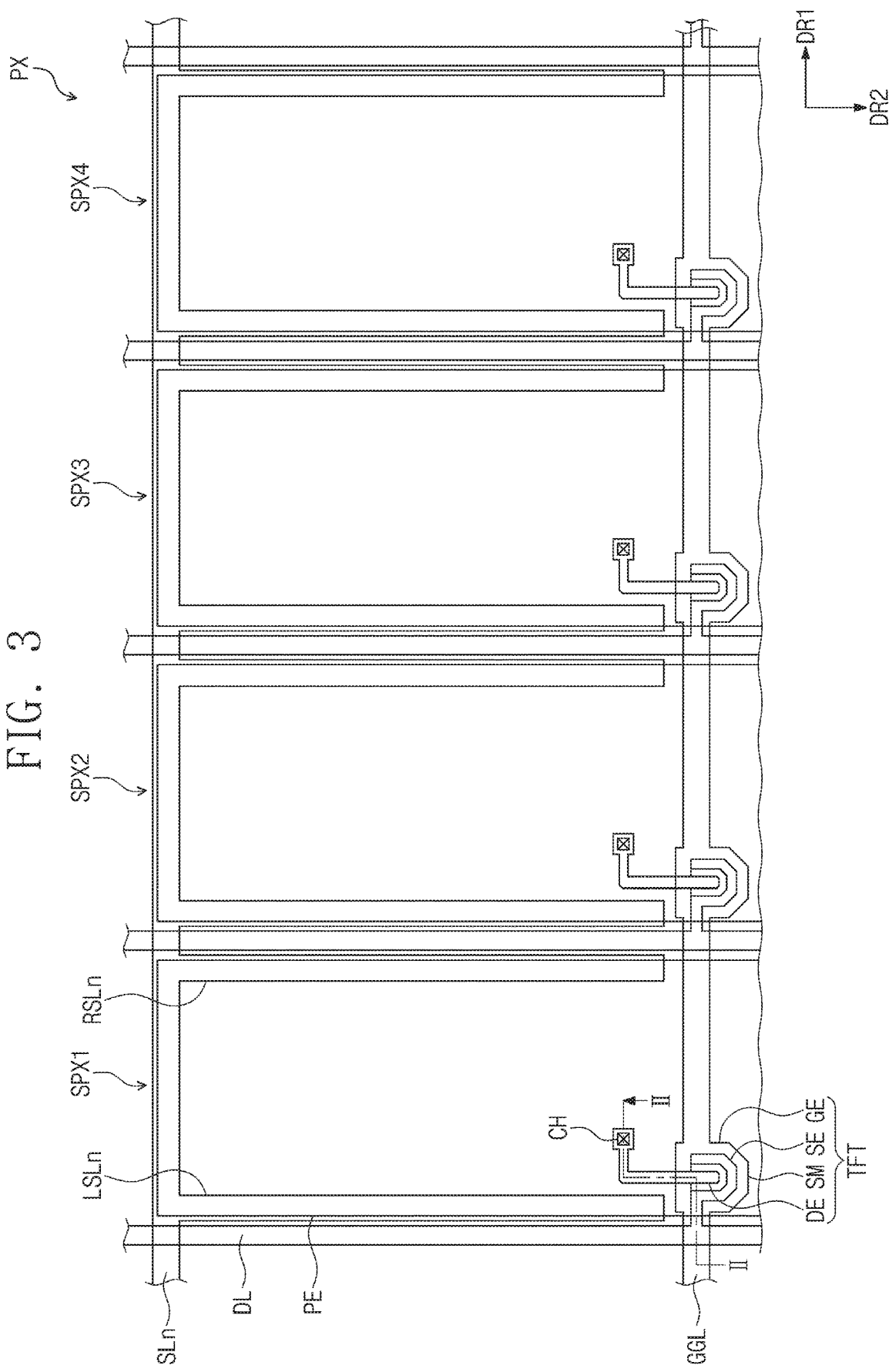
FIG. 3 is a plan view of a pixel of a reflective liquid crystal display device of an embodiment.
Figure 4:
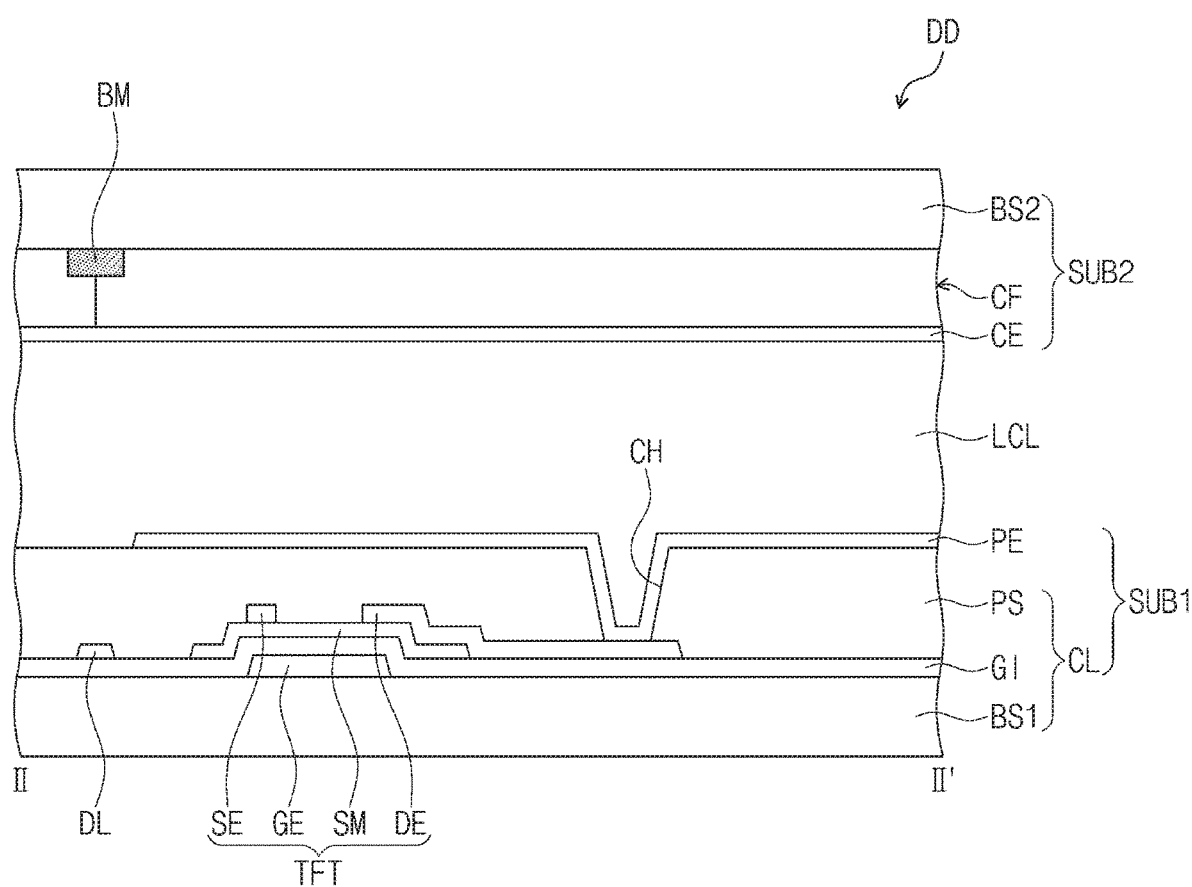
FIG. 4 is a cross-sectional view of a reflective liquid crystal display device of an embodiment in a region corresponding to the line II-IT of FIG. 3.

FIG. 3 is a schematic plan view showing pixels included in the main pixel area PX of FIG. 2. FIG. 4 is a cross-sectional view of the reflective liquid crystal display device of the embodiment corresponding to the line II-II' of the sub-pixel SPX1 of FIG. 3.

The first substrate SUB1 may include a circuit layer CL and a pixel electrode PE disposed on the circuit layer CL. The circuit layer CL may include a first base substrate BS1, a data line DL disposed on the base substrate BS1, a thin film transistor TFT, a gate insulation film GI, an insulation layer PS, and the like.

The second substrate SUB2 may be disposed to face the first substrate SUB1 with the liquid crystal layer LCL interposed therebetween. The second substrate SUB2 may include a second base substrate BS2, a color filter part CF disposed on the second base substrate BS2, and a common electrode CE disposed on the color filter part CF. Referring to FIG. 4, the color filter part CF may be disposed under the second base substrate BS2, and the common electrode CE may be disposed under the color filter part CF. Also, the color filter part CF may include a light shielding part BM. The light shielding part BM may overlap the data line DL described below.

The liquid crystal layer LCL is disposed between the first substrate SUB1 and the second substrate SUB2. For example, the liquid crystal layer LCL may include vertically aligned-liquid crystal molecules. Particularly, the reflective liquid crystal display device DD of the embodiment may be a liquid crystal display device of a vertical alignment mode. Here, the embodiment of the inventive concept is not limited, and the reflective liquid crystal display device DD may be various kinds of display devices such as a twisted nematic (TN) mode, a horizontally alignment mode, super vertical alignment (SVA) mode, a super patterned vertical alignment (S-PVA) mode, an optically compensated bend (OCB) mode, or an electrically controlled birefringence (ECB) mode.

Also, although not shown in the drawing, the reflective liquid crystal display device DD of the embodiment may further include an alignment film (not shown) so as to control the alignment of liquid crystal molecules included in the liquid crystal layer LCL. The alignment film (not shown) may be disposed on the pixel electrode PE in the first substrate SUB1, and may be disposed under the common electrode CE in the second substrate SUB2. The alignment films (not shown) included in the first substrate SUB1 and the second substrate SUB2, respectively, may be formed of the same material or different materials.

FIG. 3 illustrates sub-pixels disposed in the order of sub-pixels SPX1, SPX2, SPX3, and SPX4 in the first directional axis DR1, as an example. Each of the sub-pixels SPX1, SPX2, SPX3, and SPX4 may be repeated with the same configuration. In the description with respect to FIG. 3, one sub-pixel SPX1 is described as an example for convenience of description, and the description about the one sub-pixel SPX1 may be equally applied to the other pixels SPX2, SPX3, and SPX4.

Referring to FIGS. 3 and 4, a gate line GGL is disposed to extend in the first directional axis DR1. The gate line GGL may be disposed on the first base substrate BS1. The data line DL may be provided to extend in the second directional axis DR2 crossing the gate line GGL.

Each of the sub-pixels SPX1, SPX2, SPX3, and SPX4 includes a thin film transistor TFT, a pixel electrode PE connected to the thin film transistor TFT, and a storage electrode part. The thin film transistor TFT includes a gate electrode GE, a gate insulation film GI, a semiconductor pattern SM, a source electrode SE, and a drain electrode DE. The storage electrode part includes a storage line SLn extending in the first directional axis DR1, and further includes a first branch electrode LSLn and a second branch electrode RSLn which are branched from the storage data line SLn and extend in the second directional axis DR2.

The gate electrode GE protrudes from the gate line GGL, or is provided on a partial region of the gate line GGL. The gate electrode GE may be formed of a metal. The gate electrode GE may be formed of nickel, chrome, molybdenum, aluminum, titanium, copper, tungsten, and an alloy thereof. The gate electrode GE may be provided as a single-layered film or a multi-layered film using a metal. For example, the gate electrode GE may have a triple-layered film in which molybdenum, aluminum, and molybdenum are sequentially stacked with each other or a double-layered film in which titanium and copper are sequentially stacked with each other. Alternatively, the gate electrode GE may be a single-layered film formed of an alloy of titanium and copper.

The semiconductor pattern SM is provided on the gate insulation film GI. The semiconductor pattern SM is provided above the gate electrode GE with the gate insulation film GI disposed therebetween. A partial region of the semiconductor pattern SM overlaps the gate electrode GE. The semiconductor pattern SM includes an active pattern (not shown) provided on the gate insulation film GI and an ohmic contact layer (not shown) disposed on the active pattern. The active pattern may be formed of an amorphous silicon thin film, and the ohmic contact layer (not shown) may be formed of an n+ amorphous silicon thin film. The ohmic contact layer (not shown) creates an ohmic contact between the active pattern and each of the source electrode SE and the drain electrode DE.

The source electrode SE is branched from the data lines DL. The source electrode SE is disposed on the ohmic contact layer (not shown) and partially overlaps the gate electrode GE. The data line DL may be disposed on an area of the gate insulation film GI, on which the semiconductor pattern SM is not disposed.

The drain electrode DE is provided to be spaced apart from the source electrode SE, with the semiconductor pattern SM disposed therebetween. The drain electrode DE is disposed on the ohmic contact layer (not shown) and provided to partially overlap the gate electrode GE.

Each of the source electrode SE and the drain electrode DE may be formed of nickel, chrome, molybdenum, aluminum, titanium, copper, tungsten, and an alloy thereof. Each of the source electrode SE and the drain electrode DE may be formed of a single-layered film or a multi-layered film using a metal. For example, each of the source electrode SE and the drain electrode DE may have a double-layered film in which titanium and copper are sequentially stacked with each other. Alternatively, each of the source electrode SE and the drain electrode DE may have a single-layered film formed of an alloy of titanium and copper.

Thus, the top surface of the active pattern between the source electrode SE and the drain electrode DE is exposed, and a channel part that creates a conductive channel is defined between the source electrode SE and the drain electrode DE, according to whether a voltage of the gate electrode GE is applied. The source electrode SE and the drain electrode DE partially overlap the semiconductor pattern SM in an area except for the channel part defined by a space between the source electrode SE and the drain electrode DE.

The pixel electrode PE is connected to the drain electrode DE with the insulation layer PS disposed therebetween. The pixel electrode PE partially overlaps the storage line SLn, and the first and second branch electrodes LSLn and RSLn and provides a storage capacitor.

The insulation layer PS covers the source electrode SE, the drain electrode DE, the channel part, and the gate insulation film GI, and has a contact hole CH that exposes a portion of the drain electrode DE. For example, the insulation layer PS may be formed of silicon nitride or silicon oxide.

The pixel electrode PE is connected to the drain electrode DE via the contact hole CH defined in the insulation layer PS. The pixel electrode PE may be formed of a conductive material. In an embodiment, the pixel electrode PE may be a reflective electrode. The pixel electrode PE may include a reflective conductive material. For example, the pixel electrode PE may be disposed by including a conductive material such as silver (Ag) with high reflectivity.

In addition, although not illustrated in the drawing, a reflective layer (not shown) may be further included between the insulation layer PS and the pixel electrode PE. For example, the reflective layer (not shown) may be formed of a metal with high reflectivity, such as aluminum, an aluminum alloy, or silver (Ag). Here, the reflective layer (not shown) is disposed to overlap the pixel electrode PE, but the embodiment of the inventive concept is not limited. When the reflective layer (not shown) is included in the first substrate SUB1 for the reflective liquid crystal display device DD of the embodiment, the pixel electrode PE may be formed of a transparent conductive material. Particularly, the pixel electrode PE may be formed of transparent conductive oxide. The transparent conductive oxide may include indium tin oxide (ITO), indium zinc oxide (IZO), indium tin zinc oxide (ITZO), and the like.

Figure 5B:
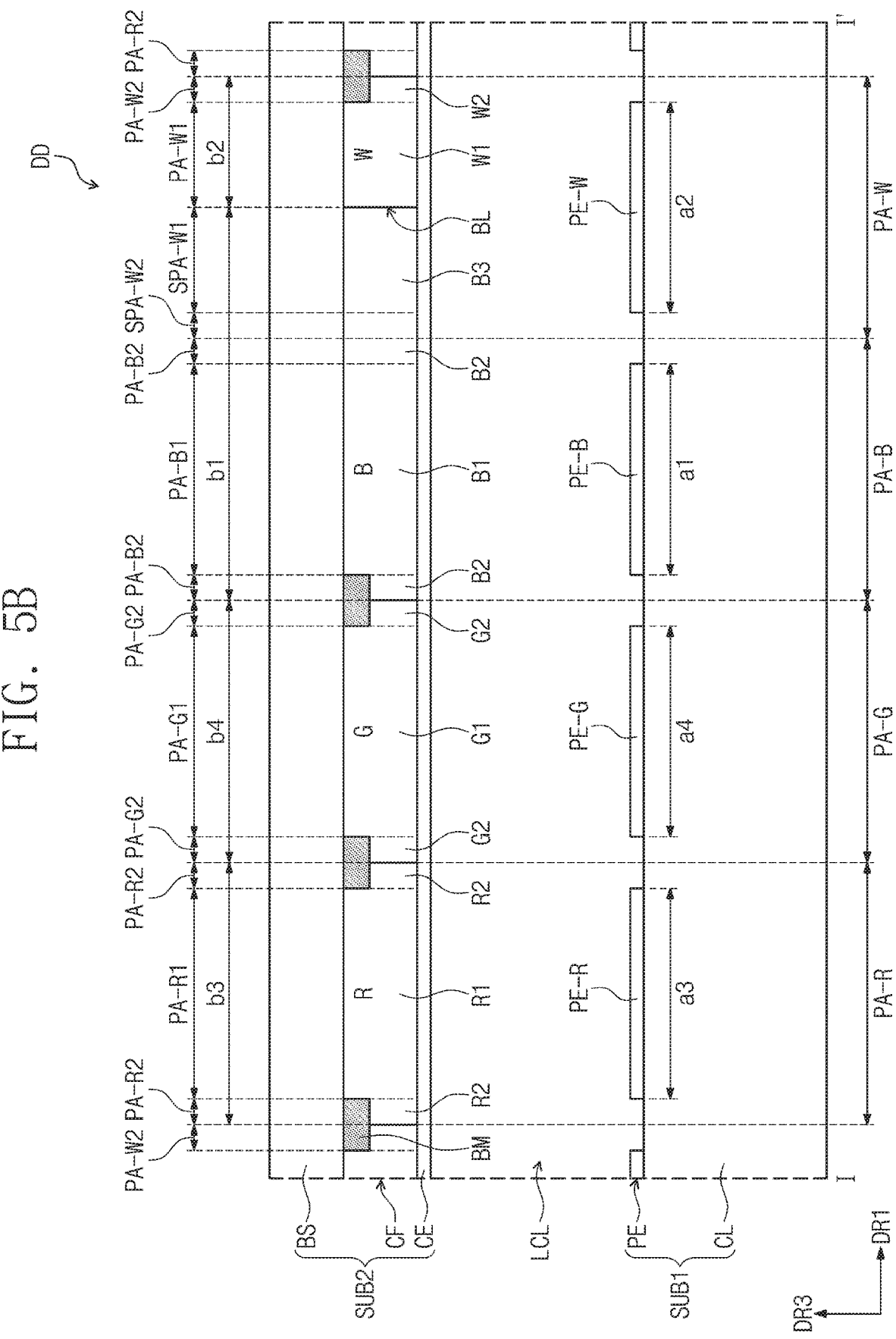
Figure 5C:
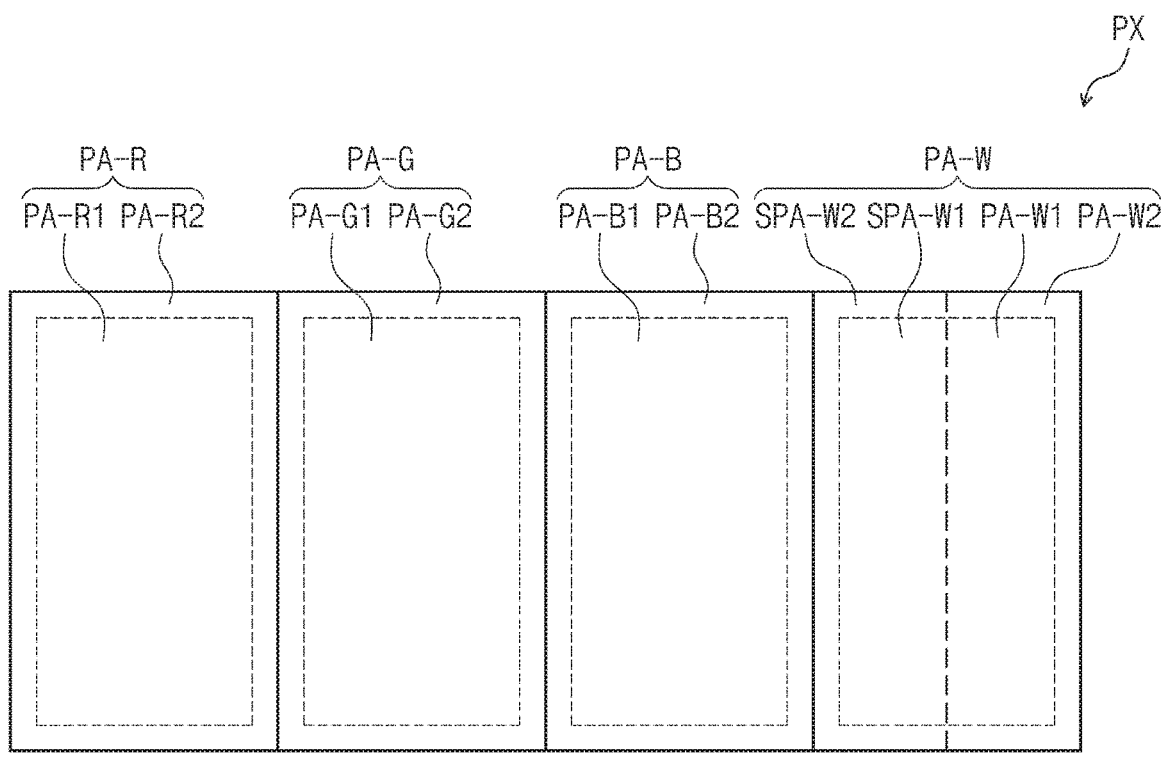
FIG. 5C is a plan view of PX of FIG. 5B.

FIGS. 5A and 5B show cross-sections corresponding to line I-I' in the reflective liquid crystal display device DD of the embodiment illustrated in FIGS. 1 and 2. FIG. 5C is a plan view showing a portion of the reflective liquid crystal display device DD of the embodiment illustrated in FIGS. 1 and 2. FIG. 5C is a plan view of PX of FIG. 5B. Here, FIGS. 5A and 5B show cross-sections parallel to a plane defined by the first directional axis DR1 and a third directional axis DR3, and the third directional axis DR3 may be the thickness direction of the reflective liquid crystal display device DD of the embodiment.

The reflective liquid crystal display device DD of the embodiment may include the plurality of pixel areas PA-R, PA-G, PA-B, and PA-W, which are arranged in the first directional axis DR1. The reflective liquid crystal display device DD of the embodiment may include the blue pixel area PA-B and the white pixel area PA-W, which are arranged in the first directional axis DR1.

Referring to FIGS. 5A to 5C, reflective liquid crystal display devices DDa and DD of the embodiments may include the red pixel area PA-R, the green pixel area PA-G, the blue pixel area PA-B, and the white pixel area PA-W, which are arranged in the first directional axis DR1. Alternatively, as described above, the reflective liquid crystal display devices DDa and DD of the embodiments may include pixel areas that produce colors other than a red color and a green color, instead of the red pixel area PA-R and the green pixel area PA-G, and the arrangement order of the red pixel area PA-R and the green pixel area PA-G may be switched to each other.

Referring to FIGS. 5A and 5B, in a cross-sectional view, the plurality of pixel electrodes PE-B, PE-W, PE-R, and PE-G are arranged, and the adjacent pixel electrodes may be disposed to be spaced apart from each other. In a cross-sectional view, first to fourth pixel electrodes PE-B, PE-W, PE-R, and PE-G have the widths a1, a2, a3 and a4, respectively, all of which may be equal to each other. Also, in a cross-sectional view, the first to fourth pixel electrodes PE-B, PE-W, PE-R, and PE-G have the areas, all of which may be equal to each other.

However, the embodiment of the inventive concept is not limited. For example, the first to fourth pixel electrodes PE-B, PE-W, PE-R, and PE-G have the widths a1, a2, a3 and a4, respectively, at least one of which may be different from the rest. Also, in a cross-sectional view, the first to fourth pixel electrodes PE-B, PE-W, PE-R, and PE-G have the areas, at least one of which may be different from the rest.

The first to fourth pixel electrodes PE-B, PE-W, PE-R, and PE-G may be disposed in the blue pixel area PA-B, the white pixel area PA-W, the red pixel area PA-R, and the green pixel area PA-G, respectively. That is, in a plan view, each edge of the first to fourth pixel electrodes PE-B, PE-W, PE-R, and PE-G may be disposed within each edge of the blue pixel area PA-B, the white pixel area PA-W, the red pixel area PA-R, and the green pixel area PA-G.

Here, in the disclosure, a blue pixel electrode, a white pixel electrode, a red pixel electrode, and a green pixel electrode may mean the first to fourth pixel electrodes PE-B, PE-W, PE-R, and PE-G, respectively.

The second substrate SUB2 includes the color filter part CF, and the color filter part CF may include, in a cross-sectional view, a red filter R, a green filter G, a blue filter B, and a white filter W in the first directional axis DR1. Here, the white filter W emits white light, and the white filter W may be formed of transparent resin. That is, the white filter W may be a transparent filter through which external light of the reflective liquid crystal display device DD is transmitted as it is and then delivered to the first substrate SUB1, and light reflected from the pixel electrode PE, the reflective layer (not shown), or the like is transmitted as it is and then emitted to the outside.

The second substrate SUB2 may further include light shielding parts BMa and BM. Each of the light shielding parts BMa and BM may be disposed between the adjacent color filters R, G, B, and W. Also, in an embodiment illustrated in FIG. 5B, the light shielding parts BM may be disposed to overlap boundaries of adjacent color filters R, G, B, and W. That is, in the embodiment illustrated in FIG. 5A, the light shielding parts BMa may not overlap the color filters R, G, B, and W in the third directional axis DR3 that is the thickness direction, but are disposed between the adjacent color filters R, G, B, and W. In the embodiment illustrated in FIG. 5B, the light shielding parts BM may be disposed between the adjacent color filters R, G, B, and W and simultaneously overlap portions of the adjacent color filters R, G, B, and W in the third directional axis DR3.

However, the light shielding parts BMa and BM are not disposed between the blue filter B and the white filter W, or at a boundary between the blue filter B and white filter W. That is, the light shielding parts BMa and BM may be disposed only between the red filter R and the green filter G, between the green filter G and the blue filter B, and between the white filter W and the red filter R. In a cross-sectional view parallel to a plane defined by the first directional axis DR1 and the third directional axis DR3, the light shielding parts BMa and BM may be disposed between a first red pixel part PA-R1 and a first green pixel part PA-G1, between the first green pixel part PA-G1 and a first blue pixel part PA-B1, and between a first white pixel part PA-W1 and a first red pixel part PA-R1. The light shielding parts BMa and BM are not disposed between the blue pixel area PA-B and the white pixel area PA-W.

Referring to FIGS. 5A and 5B, in the embodiment, the blue pixel area PA-B may include a first blue pixel part PA-B1 including a first pixel electrode PE-B and a first blue filter B1 that overlaps the first pixel electrode PE-B; and a second blue pixel part PA-B2 adjacent to the first blue pixel part PA-B1 and including a second blue filter B2 that does not overlap the first pixel electrode PE-B. That is, the first blue pixel part PA-B1 may be a region that overlaps the first pixel electrode PE-B, and the second blue pixel part PA-B2 may be a region that does not overlap the first pixel electrode PE-B. Here, referring to FIG. 5B, a second blue pixel part PA-B2 may be disposed on either side of a first blue pixel part PA-B1. Also, referring to FIG. 5C, a second blue pixel part PA-B2 may be a region disposed to surround a first blue pixel part PA-B1. In the blue pixel area PA-B, the first blue pixel part PA-B1 may have the area substantially equal to that of the first pixel electrode PE-B.

The white pixel area PA-W may be a region adjacent to the blue pixel area PA-B. Here, referring to FIGS. 1 and 2, the white pixel area PA-W may be adjacent to the blue pixel area PA-B at one side thereof, and may be adjacent to the red pixel area PA-R at the other side thereof.

The white pixel area PA-W may include a first sub-white pixel part SPA-W1 and a second sub-white pixel part SPA-W2 including a third filter B3, and a first white pixel part PA-W1 including a white filter W. Here, referring to FIG. 5B, a white pixel area PA-W may further include a second white pixel part PA-W2 adjacent to a first white pixel part PA-W1.

The first sub-white pixel part SPA-W1 may include the second pixel electrode PE-W and the third blue filter B3 that overlaps the second pixel electrode PE-W. The second sub-white pixel part SPA-W2 may be disposed between the first sub-white pixel part SPA-W1 and the second blue pixel part PA-B2. The second sub-white pixel part SPA-W2 may be included in the white pixel area PA-W, and may include the third blue filter B3 without overlapping the second pixel electrode PE-W. That is, the first sub-white pixel part SPA-W1 and the second sub-white pixel part SPA-W2 are regions included in the white pixel area PA-W, and may be the regions including the third blue filter B3 disposed extending into the white pixel area PA-W.

The first white pixel part PA-W1 may be a region including the second pixel electrode PE-W and a first white filter W1 that overlaps the second pixel electrode PE-W. Also, the second white pixel part PA-W2 may be a region including a second white filter W2 that does not overlap the second pixel electrode PE-W.

That is, the white pixel area PA-W may have both a region including the blue filter B and a region including the white filter W. A boundary BL between the blue filter B and the white filter W may be disposed in the white pixel area PA-W.

Referring to FIGS. 5B and 5C, in a cross-sectional view, the blue filter B has a first width b1, and the first width b1 of the blue filter B may greater than a1 that is the width of the first pixel electrode PE-B. Therefore, only a portion of the blue filter B overlaps the first pixel electrode PE-B. In the blue filter B, the first blue filter B1 corresponding to and facing the first pixel electrode PE-B, may be a region in which blue color is produced by an operation of liquid crystal molecules of the liquid crystal layer LCL when voltage is applied between the first pixel electrode PE-B and a common electrode CE. Also, in the blue filter B, the third blue filter B3 extending into the white pixel area PA-W may be a region in which blue color is produced when voltage is applied between the second pixel electrode PE-W and the common electrode CE. That is, the first sub-white pixel part SPA-W1 and the second sub-white pixel part SPA-W2 may be regions that emit the blue light, when operated.

Also, when voltage is applied between the second pixel electrode PE-W and the common electrode CE, the first white pixel part PA-W1 emits white light. That is, the first white pixel part PA-W1 and the second white pixel part PA-W2 of the white pixel area PA-W may be region in which white light is emitted when operated.

Therefore, when the white pixel area PA-W is operated, the white pixel area PA-W may provide the blue light emitted from the first sub-white pixel part SPA-W1 and the second sub-white pixel part SPA-W2, and simultaneously provide the white light emitted from the first white pixel part PA-W1 and the second white pixel part PA PA-W2.

Referring to FIGS. 5A to 5C, the reflective liquid crystal display devices DDa and DD of the embodiments may further include a red pixel area PA-R and a green pixel area PA-G.

The red pixel area PA-R may further include a third pixel electrode PE-R and a red filter R. The red pixel area PA-R may include a first red pixel part PA-R1 including the third pixel electrode PE-R and a first red filter R1 that overlaps the third pixel electrode PE-R. Also, in the embodiment illustrated in FIG. 5B, a red pixel area PA-R may further include a second red pixel part PA-R2 including a second red filter R2 that does not overlap the third pixel electrode PE-R. The second red pixel part PA-R2 may be disposed on either side of a first red pixel part PA-R1. Also, in a plan view, a second red pixel part PA-R2 may be disposed to surround a first red pixel part PA-R1.

The green pixel area PA-G may further include a fourth pixel electrode PE-G and a green filter G. The green pixel area PA-G may include a first green pixel part PA-G1 including the fourth pixel electrode PE-G and a first green filter G1 that overlaps the fourth pixel electrode PE-G. Also, in the embodiment illustrated in FIG. 5B, a green pixel area PA-G may further include a second green pixel part PA-G2 including a second green filter G2 that does not overlap the fourth pixel electrode PE-G. The second green pixel part PA-G2 may be disposed on either side of a first green pixel part PA-G1. Also, in a plan view, a green pixel part PA-G2 may be disposed to surround a first green pixel part PA-G1.

Figure 6A:
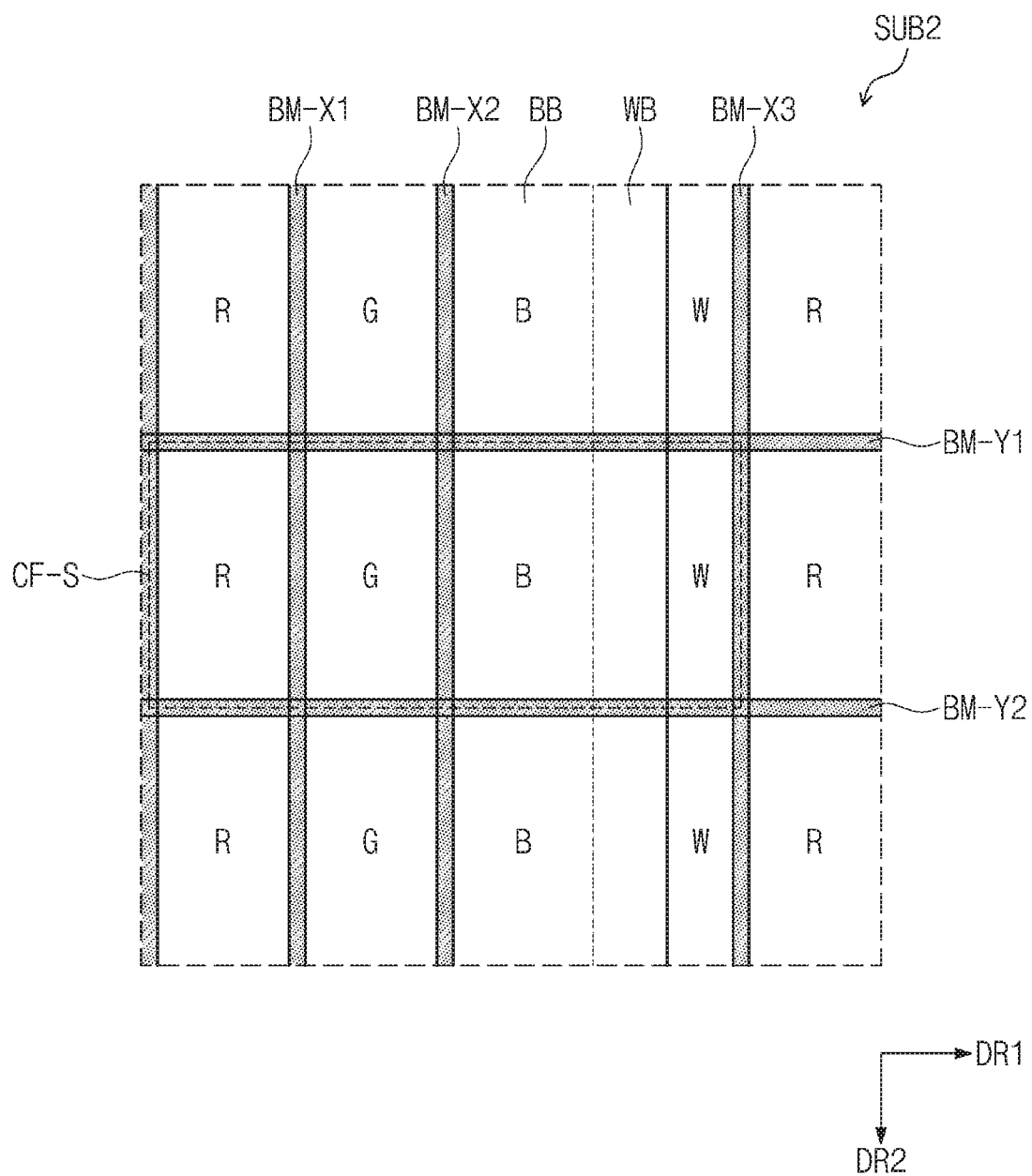
FIG. 6A is a plan view showing a portion of a reflective liquid crystal display device of an embodiment.
Figure 6B:
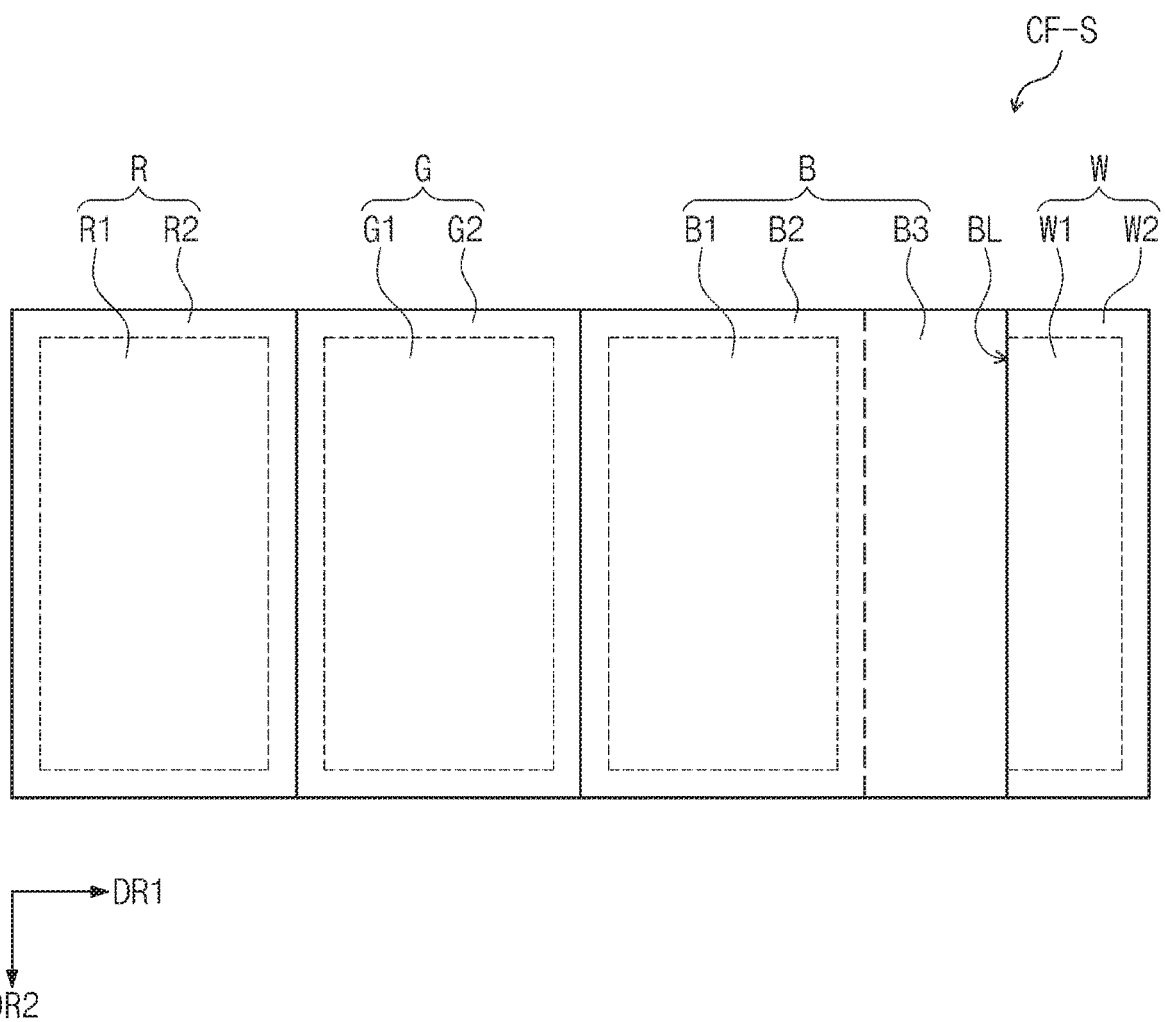
FIG. 6B is a plan view showing a portion of a color filter part included in a reflective liquid crystal display device of an embodiment.

FIG. 6A is a schematic plan view showing the second substrate SUB2 included in the reflective liquid crystal display device DD of the embodiment illustrated in FIGS. 5B and 5C. FIG. 6B is a detailed plan view showing color filters of a "CF-S" region that is a portion of FIG. 6A. FIG. 6A is a schematic plan view of a color filter part CF in the second substrate SUB2 of FIG. 5B, and FIG. 6B schematically shows only the color filter part CF excluding the light shielding part BM.

Referring to FIGS. 5B to 6B, the second substrate SUB2 includes a red filter R, a green filter G, a blue filter B, and a white filter W, which are repeatedly arranged in the first directional axis DR1. The blue filter B may include a first portion BB disposed in the blue pixel area PA-B to provide the blue light, and a second portion WB disposed in the white pixel area PA-W to provide the blue light. Also, the blue filter B may include the first blue filter B1 and the second blue filter B2 included in the blue pixel area PA-B, and may further include a third blue filter B3 which is formed of the same material and is formed in one piece with the first blue filter B1 and the second blue filter B2 and disposed in the white pixel area PA-W.

In a plan view, the blue filter B may have the area greater than that of each of a first red filter R1 and a first green filter G1. Also, in a plan view, the blue filter B may have the area greater than that of each of a red filter R and a green filter G. The area of the blue filter B means the sum of those of the first to third blue filters B1, B2, and B3. Also, the area of the red filter R is the sum of those of the first red filter R1 and a second red filter R2, and the area of the green filter G means the sum of those of the first green filter G1 and a second green filter G2.

In a plan view, a first white filter W1 may have the area less than that of each of the first red filter R1 and the first green filter G1. Also, in a plan view, the white filter W may have the area less than that of each of the red filter R and the green filter G. Here, the area of the white filter W means the sum of those of the first white filter W1 and second white filter W2.

That is, in a plan view, the size of area of each color filters may have the following relation:

Area of the white filter W<area of the green filter G or the red filter R<area of the blue filter B.

A ratio of the areas of the red filter R, the green filter G, the blue filter B, and the white filter W may be 1:1:1.6:0.4 to 1:1:1.1:0.9. Particularly, a ratio of the areas of the red filter R, the green filter G, the blue filter B, and the white filter W may be 1:1:1.4:0.6.

Also, a ratio of the area of the first white filter W1 and the area of the blue filter B may be equal to or greater than 0.25:1 and less than 1:1. When a ratio of the area of the first white filter W1 to the area of the blue filter B is less than 0.25:1, the white light is not sufficiently provided, and thus luminance of the reflective liquid crystal display device DD of the embodiment may be deteriorated. Also, when a ration of the area of the first white filter W1 to area of the blue filter B is equal to or greater than 1:1, a greenish issue of the white light may not be solved.

Particularly, in the reflective liquid crystal display device DD of the embodiment, a ratio of the area of the white filter W and the area of the blue filter B may be equal to or greater than 0.25:1 and less than 1:1. Here, the area of the white filter W may be the sum of those of the first white filter W1 and the second white filter W2. When a ratio of the area of the white filter W to the area of the blue filter B is less than 0.25:1, the white light is not sufficiently provided, and thus luminance of the reflective liquid crystal display device DD of the embodiment may be deteriorated. Also, when a ration of the areas of the white filter to area of the blue filter B is equal to or greater than 1:1, a greenish issue of the white light may not be solved. Also, for example, in the reflective liquid crystal display device DD of the embodiment, a ratio of the area of the white filter W and the area of the blue filter B may be equal to or greater than 0.25:1 and equal to or less than 0.82:1. Particularly, in the reflective liquid crystal display device DD of the embodiment, a ratio of the area of the white filter W and the area of the blue filter B may be equal to or greater than 0.4:1 and equal to or less than 0.82:1.

That is, when the white light is produced, the ratio of the blue light is made to increase by making the area of the blue filter greater than the area of each of the red filter R and the green filter G, which may solve an issue in which the white light produced by the reflective liquid crystal display device DD of the embodiment becomes red or green.

Also, the blue filter B extends from the blue pixel area PA-B into the white pixel area PA-W, and thus, in a plan view, the blue filter B may have the area equal to or greater than that of the first pixel electrode PE-B of the blue pixel area PA-B. For example, a ratio of the area of the blue filter B and the area of the first pixel electrode may be equal to or greater than 1:1 and equal to or less than 1.6:1. When a ratio of the area of the blue filter B and the area of the first pixel electrode is greater than 1.6:1, a region of the extended blue filter B becomes excessively wide, and thus the white light may be changed to be blueish.

Also, referring to FIGS. 6A and 6B, the second substrate SUB2 may include first light shielding parts BM-X1, BM-X2, and BM-X3 which extend in the second directional axis DR2 crossing the first directional axis DR1 and are disposed between the red filter R and the green filter G, between the green filter G and the blue filter B, and between the white filter W and the red filter R. Also, the second layer SUB2 may include second light shielding parts BM-Y1 and BM-Y2 which extend in the first directional axis DR1 and are disposed between the color filters having the same color. Also, FIG. 6A shows a portion of the second substrate SUB2 and the second substrate SUB2 may further include light shielding parts in addition to the illustrated light shielding parts. The first light shielding parts BM-X1, BM-X2, and BM-X3 illustrated in FIG. 6A may overlap the data line DL illustrated in FIG. 3, and the second light shielding parts BM-Y1 and BM-Y2 may overlap the gate line GGL of FIG. 3.

In the reflective liquid crystal display device DD of the embodiment, the light shielding part BM may be omitted between the blue filter B and the white filter W. For example, in the reflective liquid crystal display device DD of the embodiment, the light shielding part BM may be omitted between the blue pixel area PA-B and the white pixel area PA-W. That is, in the reflective liquid crystal display device DD of the embodiment, the light shielding part may be removed between the blue pixel area PA-B and the white pixel area PA-W to increase an aperture ratio of a region from which the blue light and the white light are emitted, thereby increasing the whole luminance of the reflective liquid crystal display device DD.

Figure 7:
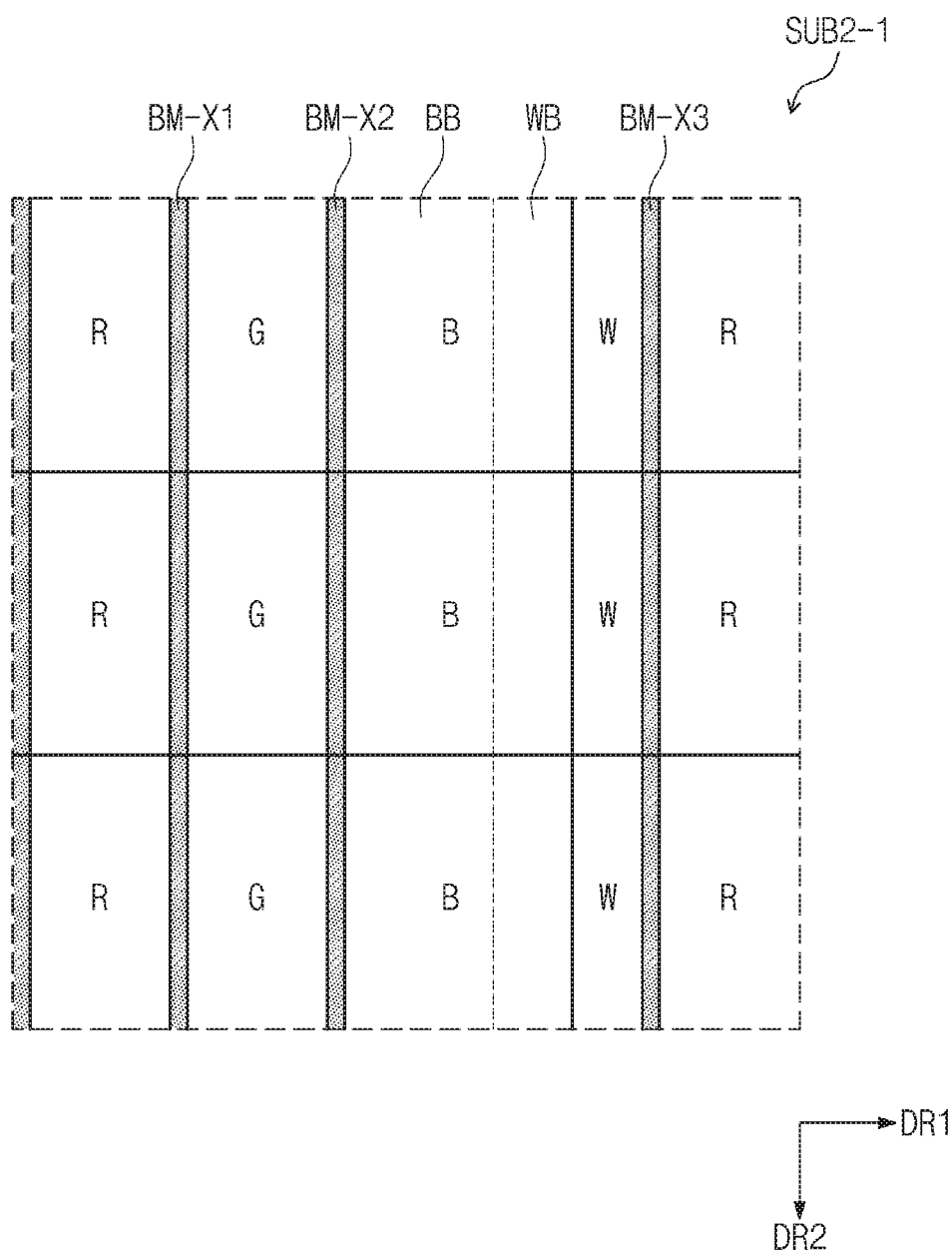
FIG. 7 is a plan view showing a portion of a reflective liquid crystal display device of an embodiment.

FIG. 7 shows another embodiment of a second substrate SUB2-1 included in the reflective liquid crystal display device DD of the embodiment. Referring to FIG. 7, in an embodiment, the second substrate SUB2-1 is different from the second substrate SUB2 of the embodiment illustrated in FIG. 6A in that the second light shielding parts BM-Y1 and BM-Y2 extending in the first directional axis DR1 are omitted. That is, in the embodiment illustrated in FIG. 7, the second substrate SUB2-1 includes the first light shielding parts BM-X1, BM-X2, and BM-X3 extending in the second directional axis DR2 and disposed between the red filter R and the green filter G, between the green filter G and the blue filter B, and between the white filter W and the red filter B, and also characterized by omitting the light shielding part between the blue filter B and the white filer W and between the pixel areas with the same color arranged in the second directional axis DR2.

The reflective liquid crystal display device DD of the embodiment illustrated in FIG. 7 is characterized by omitting the light shielding part between the blue pixel area PA-B and the white pixel area PA-W and between the adjacent pixel areas arranged in the second directional axis DR2. Here, for the second substrate SUB2-1 illustrated in FIG. 7, the same feature as described in FIG. 6A may be applied, except for omitting the light shielding parts disposed between the light pixel areas with the same color arranged in the second directional axis DR2.

In the case of the reflective liquid crystal display device DD of the embodiment including the second substrate SUB2-1 of the embodiment illustrated in FIG. 7, the light shielding part overlapping the gate line GGL (see FIG. 3) is also omitted to entirely increase aperture ratios of the pixel areas, which may increase the whole luminance of the reflective liquid crystal display device DD.

Alternatively, in the reflective liquid crystal display device DD of an embodiment, the pixel electrodes PE-B, PE-W, PE-R, and PR-G serve as reflective electrodes, or a reflective layer is further included in the first substrate, which prevents a thin film transistor TFT of the circuit layer CL (see FIG. 4) from being damaged due to the external light even in the case in which the light shielding part is omitted.

Figure 8:
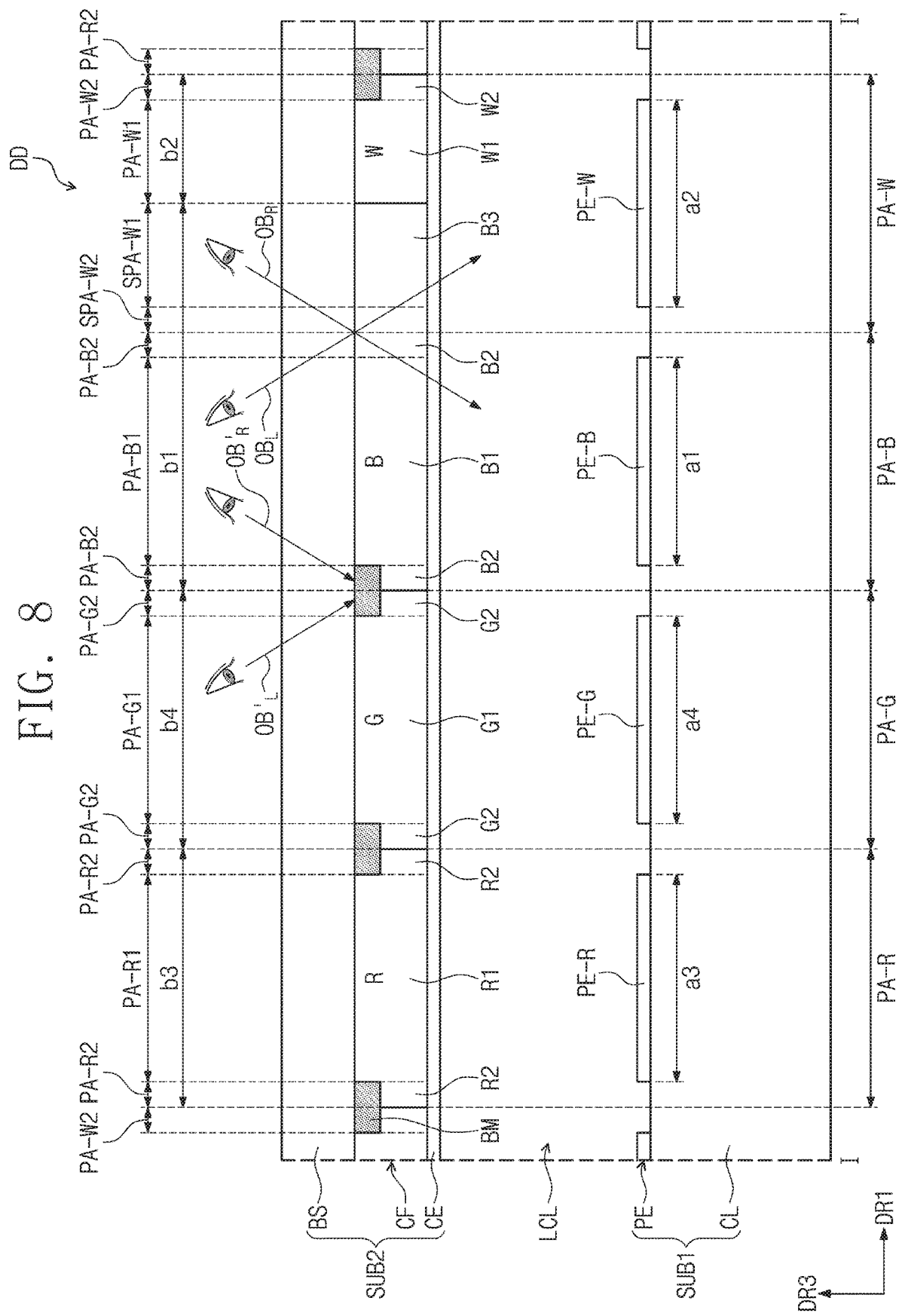
FIG. 8 is a cross-sectional view of a reflective liquid crystal display device of an embodiment.

FIG. 8 is a cross-sectional view for explaining the feature of the reflective liquid crystal display device DD of the embodiment described in FIGS. 5A to 7. Referring to FIGS. 5A to 8, the reflective liquid crystal display device DD of the embodiment makes the area of the blue filter B wide when compared to the red filter R and the green filter G, and extends the blue filter B into the white pixel area PA-W to widen the area that produce the blue light without changing light quantities of the red light and the green light, which may exhibit the improved optical characteristics. Also, the light shielding part is omitted at a boundary region between the blue pixel area PA-B and the white pixel area PA-W to increase an aperture ratio of the pixel area, such that the effect may be obtained in which reflective luminance increases.

Referring to FIG. 8, in the reflective liquid crystal display device DD of the embodiment, even in the case in which a user uses the display device in viewing-angle directions $OB_L$ and $OB_R$ from the side surface not from the front surface, the blue light is recognized at the boundary region between the blue pixel area PA-B and the white pixel area PA-W regardless of the viewing-angle directions $OB_L$ and $OB_R$. That is, in the reflective liquid crystal display device DD of the embodiment, even though the light shielding part BM is omitted between the blue pixel area PA-B and the white pixel area PA-W, a color-mixing issue is prevented from occurring at the boundary between the blue pixel area PA-B and the white pixel area PA-W because the blue filter B extends into the white pixel area PA-W.

Also, in the case in which the light shielding part BM is omitted between the blue pixel area PA-B and the white pixel area PA-W as in the reflective liquid crystal display device DD of the embodiment, as the weight of the blue light is increased by the effect of the widen blue filter B, the luminance may be improved and a greenish issue of the white light may be solved in the reflective liquid crystal display device.

However, on the contrary, the light shielding parts BM for dividing the pixel areas that produce light with different colors are disposed between the red filter R and the green filter G, between the green filter G and the blue filter B, and between the white filer W and the red filter R. Therefore, in the case in which the user uses the display device in the viewing-angle directions $OB_L$ and $OB_R$ from the side surface not from the front surface, the light shielding parts BM blocks the light, and thus the color-mixing issue may be prevented.

Hereinafter, referring to the drawings of FIGS. 9 to 11, a reflective liquid crystal display device according to an embodiment of the inventive concept is described. In describing FIGS. 9 to 11, the duplicated features whit those of FIGS. 1 to 8 are not described again, but their differences will be mainly described.

Figure 9:
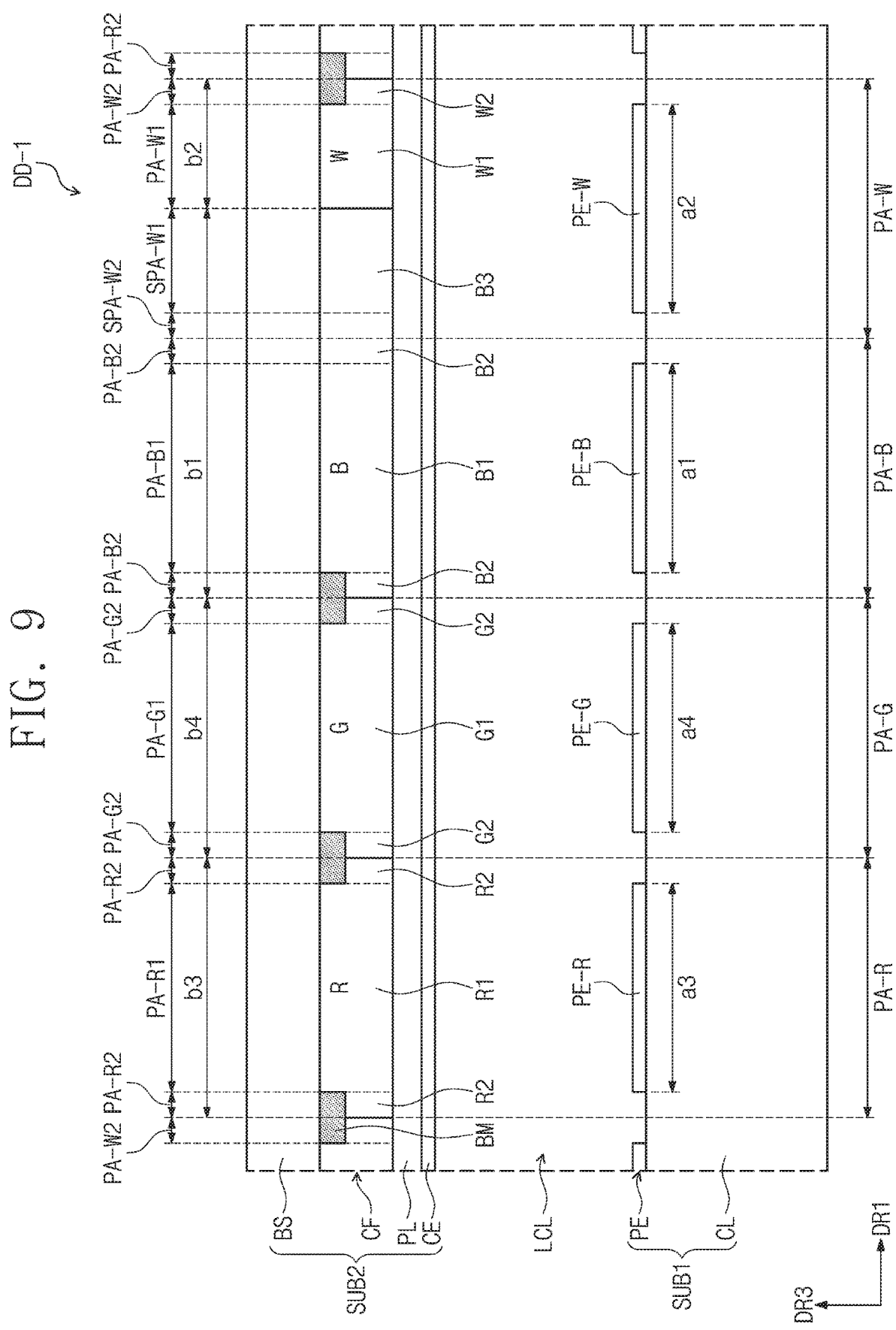
FIG. 9, FIG. 10 and FIG. 11 are cross-sectional views showing a reflective liquid crystal display device of an embodiment.

FIG. 9 is a cross-sectional view of a reflective liquid crystal display device DD-1 of an embodiment. The reflective liquid crystal display device DD-1 of the embodiment may include a plurality of pixel areas including a blue pixel area PA-B and a white pixel area PA-W, which are arranged adjacent to each other.

In a plan view, the reflective liquid crystal display device DD-1 of the embodiment includes a blue filter B extending into the white pixel area PA-W, and a light shielding part BM may be omitted between the blue pixel area PA-B and the white pixel area PA-W.

The reflective liquid crystal display device DD-1 of the embodiment may further include an auxiliary layer PL in a second substrate SUB2. Referring to FIG. 9, the auxiliary layer PL may be disposed under a color filter part CF. The auxiliary layer PL may be disposed between the color filter part CF and a common electrode CE. The auxiliary layer PL may be disposed under the color filter part CF to serve as a planarization layer.

The auxiliary layer PL may be a transparent resin layer. The auxiliary layer PL may be integrally provided with a white filter W. The auxiliary layer PL may be integrally provided with a first white filter W1. Also, the auxiliary layer PL may be integrally provided with the first white filter W1 and a second white filter W2.

The auxiliary layer PL and the white filter W may be formed of the same material and be formed in one piece. However, the embodiment of the inventive concept is not limited. For example, the auxiliary layer PL and the white filter W may be components distinguishable from each other, and may be provided from separate processes. The materials for forming the auxiliary layer PL and the white filter W may be different from each other.

Figure 10:
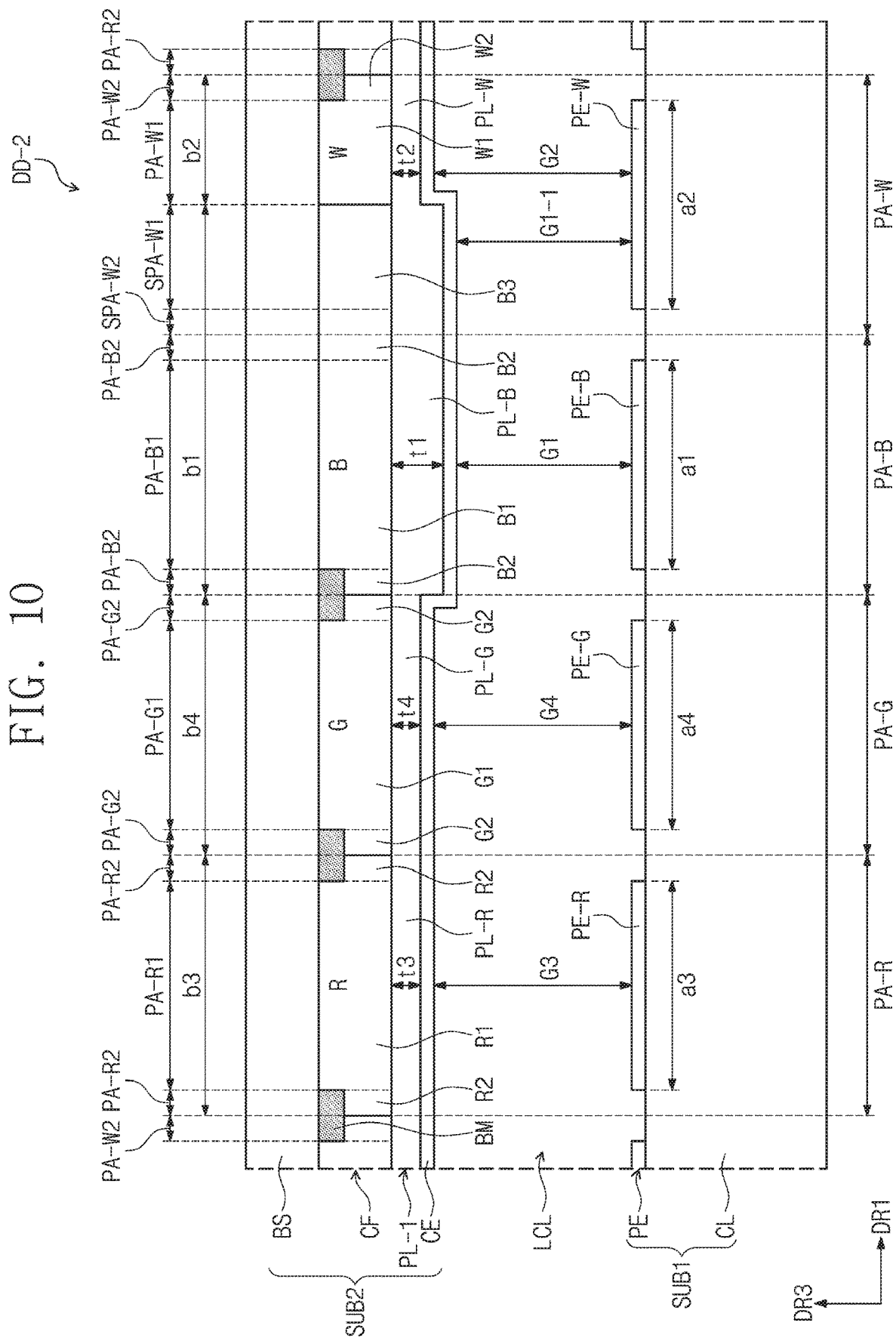
Figure 11:
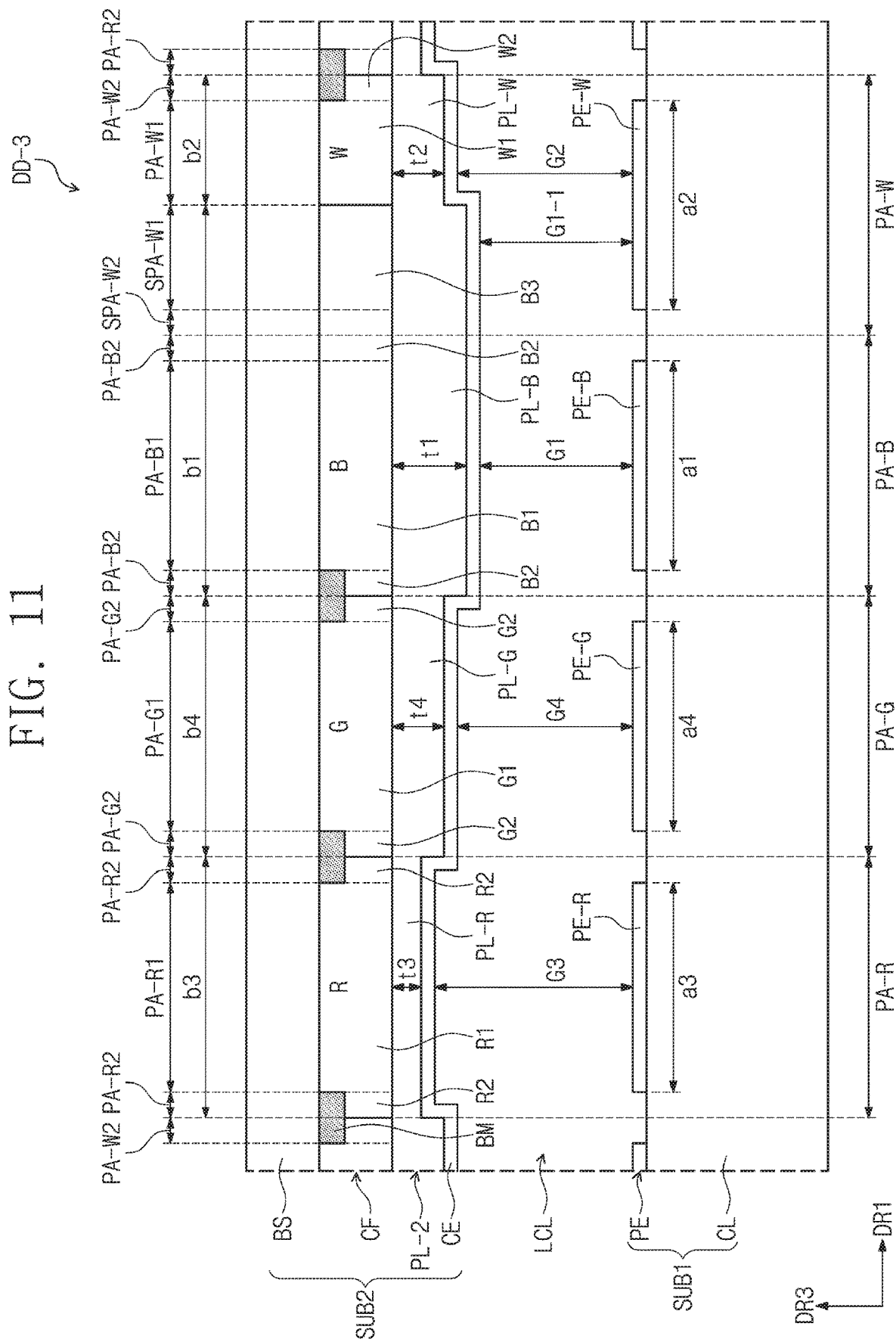

FIGS. 10 and 11 are cross-sectional views of reflective liquid crystal display devices of embodiments. Reflective liquid crystal display devices DD-2 and DD-3 of the embodiments illustrated in FIGS. 10 and 11 further include auxiliary layers PL-1 and PL-2, when compared to the reflective liquid crystal display device DD of the embodiment illustrated in FIGS. 1 to 9, there is a difference in that the thicknesses of the auxiliary layers PL-1 and PL-2 at regions that overlap the blue filter B are greater than the thicknesses of the auxiliary layers PL-1 and PL-2 at regions that do not overlap the blue filter B.

Referring to illustrations of FIGS. 10 and 11, in the reflective liquid crystal display devices DD-2 and DD-3 of the embodiments, the auxiliary layers PL-1 and PL-2 may be further included in a second substrate SUB2. The auxiliary layer PL-1 and PL-2 may be disposed between a color filter part CF and a common electrode CE.

The reflective liquid crystal display device DD-2 and DD-3 of the embodiment may include a plurality of pixel areas including a blue pixel area PA-B and a white pixel area PA-W, which are arranged adjacent to each other. In the reflective liquid crystal display devices DD-2 and DD-3 of the embodiments, the color filter part CF may include a red filter R, a green filter G, a blue filter B, and a white filter W. The blue filter B may include first and second blue filters B1 and B2 included in the blue pixel area PA-B, and may include a third blue filter B3 included in the white pixel area PA-W.

The red filter R may include first and second red filters R1 and R2, the green filter G may include first and second green filters G1 and G2, and the white filter W may include first and second white filters W1 and W2.

The auxiliary layers PL-1 and PL-2 may include a first auxiliary layer PL-B configured to cover the first to third blue filters B1, B2, and B3, a second auxiliary layer PL-W configured to cover the first and second white filters W1 and W2; a third auxiliary layer PL-R configured to cover the first and second red filters R1 and R2; and a fourth auxiliary layer PL-G configured to cover the first and second green filters G1 and G2. The first auxiliary layer PL-B may have the thickness equal to or greater than those of the second to fourth auxiliary layers PL-W, PL-R, and PL-G. The thickness of the first auxiliary layer PL-B may be formed greater than those of the second to fourth auxiliary layers PL-W, PL-R, and PL-G. The thickness of the first auxiliary layer PL-B is formed greater than those of the second to fourth auxiliary layers PL-W, PL-R, and PL-G. Therefore, a cell gap of a liquid crystal layer LCL corresponding to a region in which the first auxiliary layer PL-B is disposed, may be adjusted to become less than cell gaps of the liquid crystal layer LCL corresponding to regions in which the second to fourth auxiliary layers PL-W, PL-R, and PL-G are disposed.

That is, in the reflective liquid crystal display devices DD-2 and DD-3 of the embodiments, when the thickness of the first auxiliary layer PL-B is t1, the thickness of the second auxiliary layer PL-W is t2, the thickness of the third auxiliary layer PL-R is t3, and the thickness of the fourth auxiliary layer PL-G is t4, t1 may be equal to or greater than t2, t3, and t4.

In the embodiment of the reflective liquid crystal display device DD-2 of FIG. 10, t1 may be greater than t2 to t4. Also t2 to t4 may have the same thickness. The first auxiliary layer PL-B may be provided to entirely overlap the blue filter B disposed in the blue pixel area PA-B and the white pixel area PA-W. The thickness t1 of the first auxiliary layer PL-B may be uniform.

Here, a boundary between the first auxiliary layer PL-B and the second auxiliary layer PL-W may be disposed within the white pixel area PA-W. That is, a stepped portion between the first auxiliary layer PL-B and the second auxiliary layer PL-W may be disposed within the white pixel area PA-W.

A gap G1 between a first pixel electrode PE-B and the first auxiliary layer PL-B that overlaps the first and second blue filters B1 and B2 may be equal to a gap G1-1 between the second pixel electrode PE-W and the first auxiliary layer PL-B that overlaps the third blue filter B3. That is, the thicknesses of the auxiliary layer PL may change according to color types produced by the color filter. Therefore, the thicknesses of the first auxiliary layer PL-B overlapping the first to third blue filters B1, B2, and B3 that are filters of the same color, may be uniform across the entire regions overlapping the blue filter B. Here, in the disclosure, to be uniform means to be substantially equal to each other, and this corresponds to including the tolerance range on the process.

In the embodiment illustrated in FIG. 10, the thicknesses of the second to fourth auxiliary layers PL-W, PL-R, and PL-G may be less than the thickness of the first auxiliary layer PL-B, and the thicknesses of the second to fourth auxiliary layers PL-W, PL-R, and PL-G may be the same. Also, a gap G2 between the second auxiliary layer PL-W and the second pixel electrode PE-W, a gap G3 between the third auxiliary layer PL-R and a third pixel electrode PE-R, and a gap G4 between the fourth auxiliary layer PL-G and a fourth pixel electrode PE-G, may be substantially the same. That is, the thickness G1 of the liquid crystal layer between the first auxiliary layer PL-B and the first substrate SUB1 which overlap the blue filter B, may be less than G2, G3, and G4 of the liquid crystal layer, which are the thicknesses from the first substrate SUB1 to the white filter W, the red filter R, and the green filter G, respectively.

Therefore, in the reflective liquid crystal display device DD-2 of the embodiment illustrated in FIG. 10, the cell gap of the liquid crystal layer LCL corresponding to the blue filter for producing color with a relatively short wavelength range, is made to be less than the cell gaps of the liquid crystal layer LCL corresponding to the color filters for producing other colors, which may mitigate deterioration of display quality due to variation of phase differences between the pixel areas caused by wavelength dispersibility of liquid crystal molecules.

In the reflective liquid crystal display device DD-3 of the embodiment illustrated in FIG. 11, first to fourth auxiliary layers PL-B, PL-W, PL-R, and PL-G may be adjusted to have the following relation:

$$t3 < t2 = t4 < t1$$

where t1 is the thickness of the first auxiliary layer PL-B, t2 represents the thickness of the second auxiliary layer PL-W, t3 represents the thickness of the third auxiliary layer PL-R, and t4 represents the thickness of the fourth auxiliary layer PL-G.

The thicknesses of an auxiliary layer PL-2 may be adjusted depending on a wave-length of a color produced in the color filter, for example, the area producing a shorter wave-length of the color may have a thicker auxiliary layer PL-2. Referring to FIG. 11, the thickness t4 of the fourth auxiliary layer PL-G disposed corresponding to the green filter G, may be greater than the thickness t3 of the third auxiliary layer PL-R disposed corresponding to the red filter R. Also, the thickness t1 of the first auxiliary layer PL-B disposed corresponding to the blue filter B, may greater than the thickness t4 of the fourth auxiliary layer PL-G.

Here, the thickness t2 of the second auxiliary layer PL-W disposed corresponding to a white filter W, may be equal to the thickness t4 of the fourth auxiliary layer PL-G disposed corresponding to the green filter G.

That is, in the reflective liquid crystal display device DD-2 of the embodiment, corresponding to the color filters for producing the different colors, the auxiliary layer corresponding to the color filter which has a relatively short wavelength is made to be greater, which may mitigate deterioration of display quality caused by wavelength dispersibility of liquid crystal.

Figure 12A:
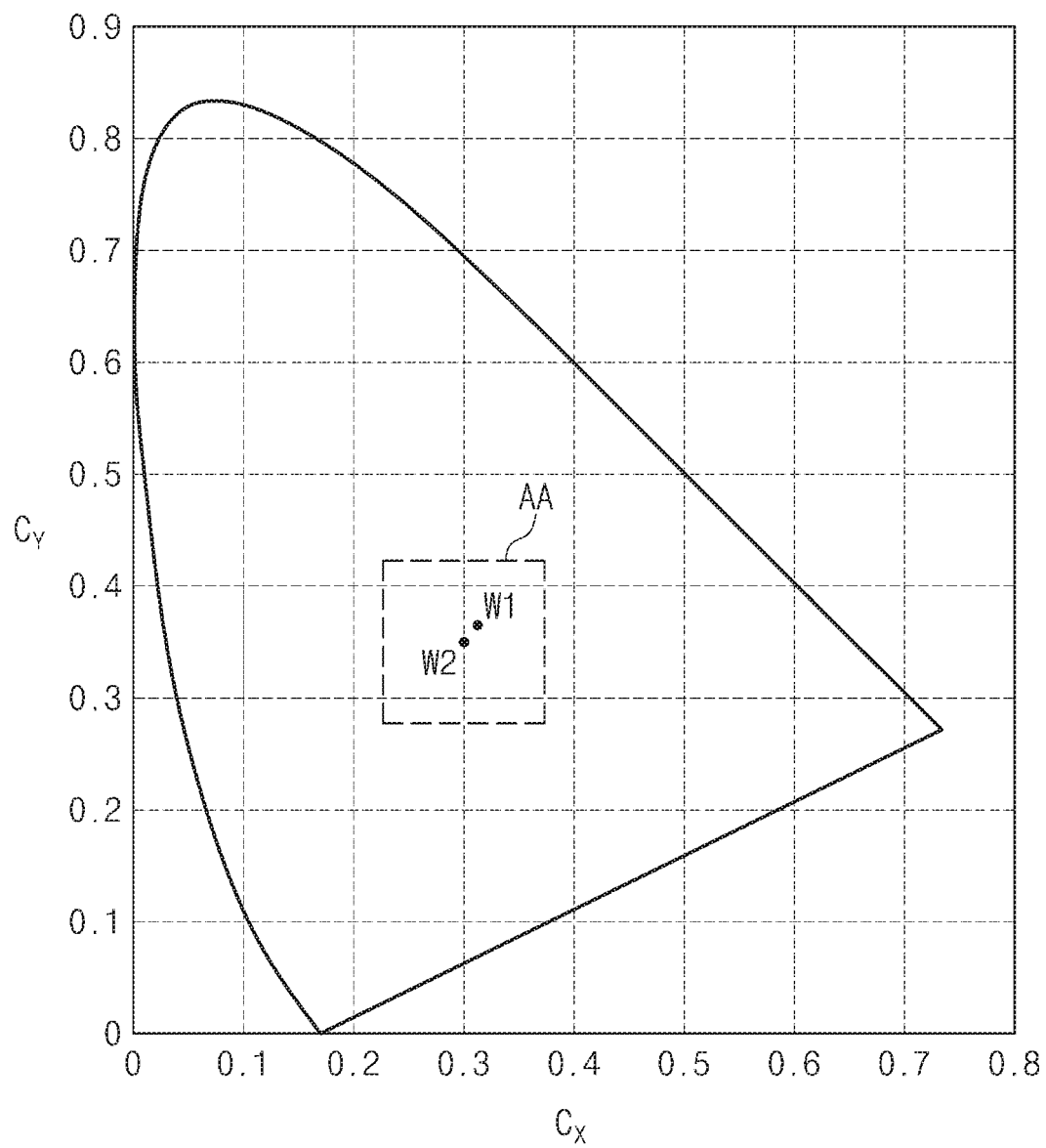
FIG. 12A and FIG. 12B show a change of color coordinates of white light in a reflective liquid crystal display device of a comparative example and an embodiment.
Figure 12B:
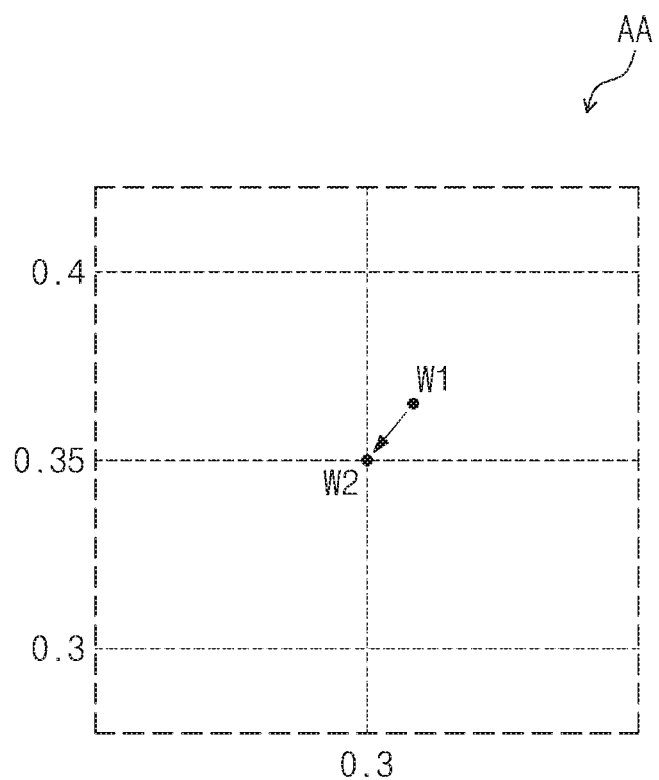

Table 1 below shows reflective luminance of the white light and color coordinates of the white light, comparing the reflective liquid crystal display device of the embodiment and a reflective liquid crystal display device according to the related art. Also, FIGS. 12A and 12B illustrate the color coordinates of the white light, comparing the reflective liquid crystal display device of the embodiment and the reflective liquid crystal display device according to the related art. FIG. 12B is an enlarged view of a region "AA" of FIG. 12A. In FIGS. 12A and 12B, W1 is a position of the color coordinate of the white light in the comparative example of Table 1 below, and W2 indicates the color coordinate of the white light in the embodiment.

In Table 1 and FIGS. 12A and 12B, the reflective luminance of the white light and the color coordinates of the white light are represented by the simulation result, and are the result from evaluating the white light in the case in which the white color is produced by operating all of the red pixel area, the green pixel area, the blue pixel area, and the white pixel area.

In Table 1 for the comparative example, the areas of color filters are made to be the same. That is, the evaluation test results are shown for the reflective liquid crystal display device in the case in which the all areas of the red filter, the green filter, the blue filter, and the white filter are made to be the same, and a light shielding part is not removed between the blue pixel area and the white pixel area.

Also, for the embodiment, the evaluation test results are shown for the reflective liquid crystal display device in the case in which a ratio of the areas of the red filter, the green filter, the blue filter, and the white filter is made to be 1:1:1.6:0.4, and the auxiliary layer corresponding to the blue filter is made to be greater. For example, for the embodiment, the simulation test results may be shown, in assuming the configuration of the reflective liquid crystal display device DD-2 of the embodiment illustrated in FIG. 10.

TABLE 1

| Item | Comparison Example | Embodiment | Difference between Comparative example and Embodiment |
| --- | --- | --- | --- |
| Reflective luminance (%) | 42.94 | 44.4 | +1.5 |
| Color coordinate Cx | 0.319 | 0.305 | −0.014 |
| Color coordinate Cy | 0.367 | 0.354 | −0.013 |

Referring to the results of Table 1, it may be confirmed that the reflective luminance of the white light increases in the embodiment, compared to the comparative example. That is, for the embodiment, as the area of the blue filter increases, the area of the white filter relatively decreases. However, it may be understood that the light shielding part is removed between the blue pixel area and the white pixel area, which increases the reflective luminance.

Also, referring to Table 1 and FIGS. 12A and 12B, all values of Cx and Cy which are the white color coordinate values decrease in the embodiment, compared to the comparative example, and thus it may be understood that the white light of the embodiment is shifted to the blue area, compared to the comparative example.

That is, it may be confirmed that the area of the blue filer is made to be large in the case of the reflective liquid crystal display device of the embodiment, which may solve the greenish issue of the white light that has been raised in the reflective liquid crystal display device according to the related art represented as the comparative example.

The reflective liquid crystal display device of the embodiment makes the area of the blue filter greater than the color filters with other colors, which may mitigate the phenomenon in which the white light produced by the reflective liquid crystal display device becomes green. Also, the reflective liquid crystal display device of the embodiment makes the thickness of the auxiliary layer corresponding to the blue filter greater than the thicknesses of the auxiliary layers disposed corresponding to the color filters with other colors, which may mitigate deterioration of display quality caused by wavelength dispersibility of liquid crystal.

The embodiment may provide the reflective liquid crystal display device that increases the area of the blue filter and removes the light shielding part between the blue filter and the white filter to exhibit the high reflective luminance, and solves the greenish issue.

The embodiment may provide the reflective liquid crystal display device that increases the area of the blue filter and adjusts the cell gap of the liquid crystal at the region corresponding to the blue filter to improve the display quality.

Although described with reference to preferred embodiments of the present disclosure, it will be understood that various changes and modifications of the present disclosure can be made by one skilled in the art or one having ordinary knowledge in the art without departing from the spirit and technical field of the present disclosure as hereinafter claimed.

Hence, the technical scope of the present disclosure is not limited to the detailed descriptions in the specification, but it should be determined only by reference of the claims.

What is claimed is:

1. A reflective liquid crystal display device comprising:
a plurality of pixel areas, wherein the pixel areas comprise a blue pixel area and a white pixel area adjacent to each other in a first direction; and
a light shielding part disposed to overlap boundaries between the plurality of pixel areas except a boundary between the blue pixel area and the white pixel area in a plan view,
wherein the blue pixel area comprises:
a first blue pixel part comprising a first pixel electrode and a first blue filter that overlaps the first pixel electrode, and
a second blue pixel part adjacent to the first blue pixel part and comprising a second blue filter that does not overlap the first pixel electrode, and
the white pixel area comprises:
a first sub-white pixel part comprising a second pixel electrode and a third blue filter that overlaps the second pixel electrode;
a second sub-white pixel part disposed between the second blue pixel part and the first sub-white pixel part and comprising the third blue filter that does not overlap the second pixel electrode; and
a first white pixel part adjacent to the first sub-white pixel part and comprising the second pixel electrode and a first white filter that overlaps the second pixel electrode.

2. The reflective liquid crystal display device of claim 1, wherein the plurality of pixel areas further comprises a red pixel area and a green pixel area,
the red pixel area comprises a first red pixel part that comprises a third pixel electrode and a first red filter that overlaps the third pixel electrode, and
the green pixel area comprises a first green pixel part that comprises a fourth pixel electrode and a first green filter that overlaps the fourth pixel electrode.

3. The reflective liquid crystal display device of claim 2, wherein the white pixel area further comprises a second white pixel part adjacent to the first white pixel part and comprising a second white filter that does not overlaps the second pixel electrode, the red pixel area further comprises a second red pixel part adjacent to the first red pixel part and comprising a second red filter that does not overlap the third pixel electrode, and
the green pixel area further comprises a second green pixel part adjacent to the first green pixel part and comprising a second green filter that does not overlap the fourth pixel electrode.

4. The reflective liquid crystal display device of claim 2, wherein each of the red pixel area, the green pixel area, the blue pixel area, and the white pixel area is provided in plurality, and
the respective red pixel areas, the respective green pixel areas, the respective blue pixel areas, and the respective white pixel areas are arranged in a second direction crossing the first direction.

5. The reflective liquid crystal display device of claim 2, wherein, in a plan view, a blue filter has the area greater than that of each of the first red filter and the first green filter, and
the blue filter has the area equal to the sum of those of the first blue filter, the second blue filter, and the third blue filter.

6. The reflective liquid crystal display device of claim 5, wherein, in a plan view, the first white filter has the area less than that of each of the first red filter and the first green filter.

7. The reflective liquid crystal display device of claim 6, wherein a ratio of the area of the first white filter and the area of the blue filter is equal to or greater than 0.25:1 and less than 1:1.

8. The reflective liquid crystal display device of claim 6, wherein a ratio of the area of the blue filter and the area of the first pixel electrode is equal to or greater than 1:1 and equal to or less than 1.6:1.

9. The reflective liquid crystal display device of claim 2, further comprising an auxiliary layer,
wherein the auxiliary layer comprises:
a first auxiliary layer configured to cover the first to third blue filters;
a second auxiliary layer configured to cover the first white filter;
a third auxiliary layer configured to cover the first red filter; and
a fourth auxiliary layer configured to cover the first green filter.

10. The reflective liquid crystal display device of claim 9, wherein the first auxiliary layer has a thickness equal to or greater than that of each of the second to fourth auxiliary layers.

11. The reflective liquid crystal display device of claim 9, wherein the thickness of the first auxiliary layer is t1, the thickness of the second auxiliary layer is t2, the thickness of the third auxiliary layer is t3, and the thickness of the fourth auxiliary layer is t4, where $t3<t2=t4<t1$.

12. The reflective liquid crystal display device of claim 9, wherein the first white filter and the second auxiliary layer are formed of the same material and are formed in one piece.

13. The reflective liquid crystal display device of claim 9, wherein, in a plan view, a boundary between the first auxiliary layer and the second auxiliary layer is disposed in the white pixel area.

14. The reflective liquid crystal display device of claim 9, wherein a gap between the first auxiliary layer and the first pixel electrode is G1, a gap between the third auxiliary layer and the third pixel electrode is G3, and a gap between the fourth auxiliary layer and the fourth pixel electrode is G4, wherein G1 is equal to or less than G3 and G4.

15. The reflective liquid crystal display device of claim 1, wherein, in a plan view, a boundary between the third blue filter and the first white filter is disposed in the white pixel area.

16. A reflective liquid crystal display device, comprising:
- a first substrate including a plurality of pixel electrodes arranged to be spaced apart from each other in a first direction, the plurality of pixel electrodes including a red pixel electrode, a green pixel electrode, a blue pixel electrode, and a white pixel electrode;
- a second substrate comprising a color filter part that comprises a red filter, a green filter, a blue filter, and a white filter facing the red, green, blue, and white pixel electrodes, respectively, and a light shielding part disposed between the plurality of pixel electrodes except an area between the blue pixel electrode and the white pixel electrode in a plan view; and
- a liquid crystal layer disposed between the first substrate and the second substrate,
  wherein the blue filter comprises:
    a first blue filter overlapping the blue pixel electrode;
    a second blue filter adjacent to the first blue filter and not overlapping the blue pixel electrode; and
    a third blue filter overlapping the white pixel electrode,
  wherein the white filter comprises a first white filter overlapping the white pixel electrode.

17. The reflective liquid crystal display device of claim 16, wherein the blue filter has the area greater than that of each of the red filter and the green filter, and
each of the red filter and the green filter has the area greater than that of the white filter.

18. The reflective liquid crystal display device of claim 16, further comprising an auxiliary layer facing the first substrate and configured to cover the color filter part,
wherein a first gap between the auxiliary layer and the first substrate in an area overlapping the blue filter is equal to or less than a second gap between the auxiliary layer and the first substrate in areas overlapping the red filter, the green filter, and the white filter.

19. The reflective liquid crystal display device of claim 16, wherein the liquid crystal layer comprises vertically aligned-liquid crystal molecules.

* * * * *